United States Patent
Gu et al.

(10) Patent No.: US 12,361,336 B2
(45) Date of Patent: Jul. 15, 2025

(54) PROVIDING EPHEMERAL-TRANSPORTATION OPTIONS IN REAL TIME FOR SHARING ACTIVE TRANSPORTATIONS

(71) Applicant: Lyft, Inc., San Francisco, CA (US)

(72) Inventors: Janie Jia Gu, San Francisco, CA (US); Mayank Gulati, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 846 days.

(21) Appl. No.: 17/039,321

(22) Filed: Sep. 30, 2020

(65) Prior Publication Data

US 2022/0101208 A1 Mar. 31, 2022

(51) Int. Cl.
*G06Q 10/02* (2012.01)
*G06Q 10/0631* (2023.01)
*G06Q 30/0283* (2023.01)
*G06Q 50/40* (2024.01)
*H04W 4/02* (2018.01)

(52) U.S. Cl.
CPC ....... *G06Q 10/02* (2013.01); *G06Q 10/06312* (2013.01); *G06Q 30/0283* (2013.01); *G06Q 50/40* (2024.01); *H04W 4/025* (2013.01)

(58) Field of Classification Search
CPC .............................. G06Q 10/025; G06Q 50/02
USPC ............................................................. 705/5
See application file for complete search history.

(56) References Cited

U.S. PATENT DOCUMENTS

| | | | |
|---|---|---|---|
| 10,147,325 B1 * | 12/2018 | Copeland | G06Q 20/145 |
| 10,339,474 B2 * | 7/2019 | Lord | G06Q 10/06311 |
| 10,425,490 B2 * | 9/2019 | Yamashita | G06Q 10/047 |
| 10,685,297 B2 * | 6/2020 | Meyer | G06Q 50/14 |
| 2015/0262430 A1 * | 9/2015 | Farrelly | G06Q 10/02 705/13 |
| 2017/0059347 A1 * | 3/2017 | Flier | G06Q 10/08355 |
| 2019/0057476 A1 * | 2/2019 | Zhang | G06Q 50/40 |

(Continued)

OTHER PUBLICATIONS

"How to Create a Rideshare App for Your Offline Business," by Sveta Cherednichenko, Mar. 1, 2023 (Year: 2023).*

*Primary Examiner* — Jeff Zimmerman
*Assistant Examiner* — Brian Adams Heflin
(74) *Attorney, Agent, or Firm* — Keller Preece PLLC

(57) ABSTRACT

The present disclosure relates to systems, non-transitory computer-readable media, and methods for detecting a potential (or active) shared transportation request from a new requestor's device and an ongoing (or otherwise active) transportation for an existing requestor by a vehicle and then extemporaneously generating an ephemeral-transportation option for display on the new requestor's device to share the ongoing transportation by the vehicle. For example, the disclosed systems can detect a pickup location and a drop-off location associated with a new requestor and one or more active transportations that correlate with the detected locations. Based on the detected pickup and drop-off locations, the disclosed systems match the new requestor with the active transportation by the vehicle for the existing requestor. The disclosed systems then provide, for display on the new requestor's device, an ephemeral-transportation option for the new requestor to share the active transportation with the existing requestor.

20 Claims, 13 Drawing Sheets

(56) References Cited

U.S. PATENT DOCUMENTS

| | | | |
|---|---|---|---|
| 2019/0204992 A1* | 7/2019 | Bowden | G01C 21/343 |
| 2019/0206009 A1* | 7/2019 | Gibson | G06Q 50/40 |
| 2019/0311629 A1* | 10/2019 | Sierra | G06Q 10/02 |
| 2019/0370702 A1* | 12/2019 | Li | G06Q 10/02 |
| 2021/0113153 A1* | 4/2021 | Nothacker | A61B 5/7264 |
| 2021/0155221 A1* | 5/2021 | Gottehrer | B60W 20/40 |
| 2021/0219257 A1* | 7/2021 | Anand | H04W 4/029 |
| 2021/0248520 A1* | 8/2021 | Krishnamurthy | G06Q 10/02 |
| 2022/0284792 A1* | 9/2022 | Gerrese | H04W 4/48 |

* cited by examiner

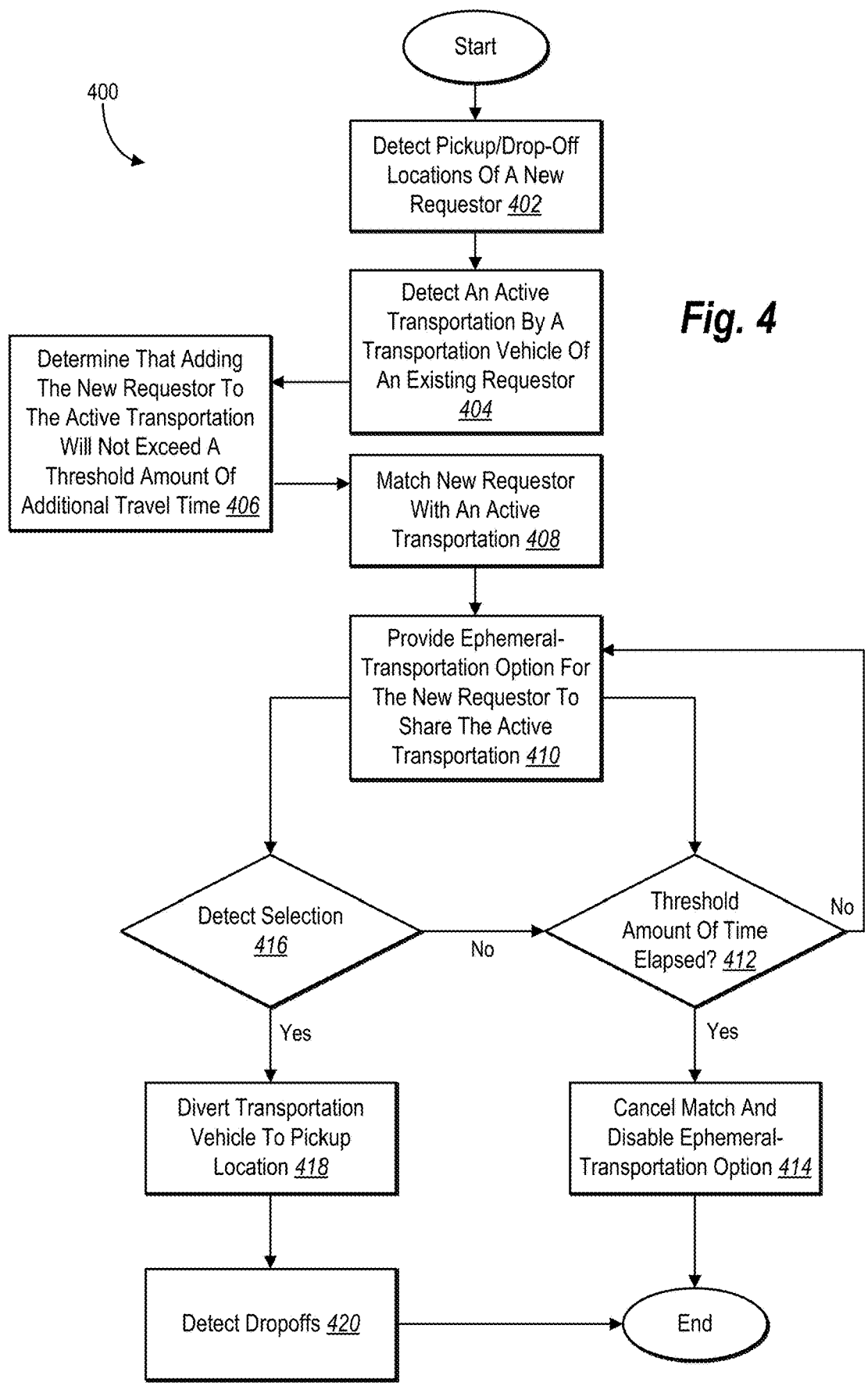

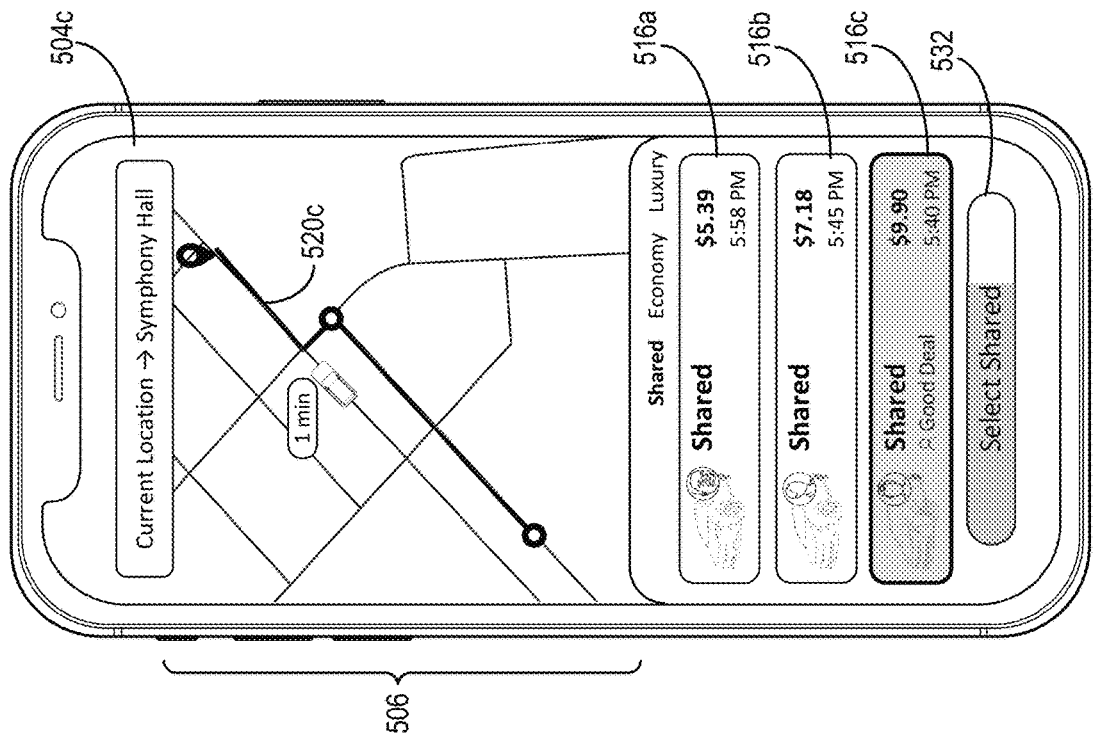
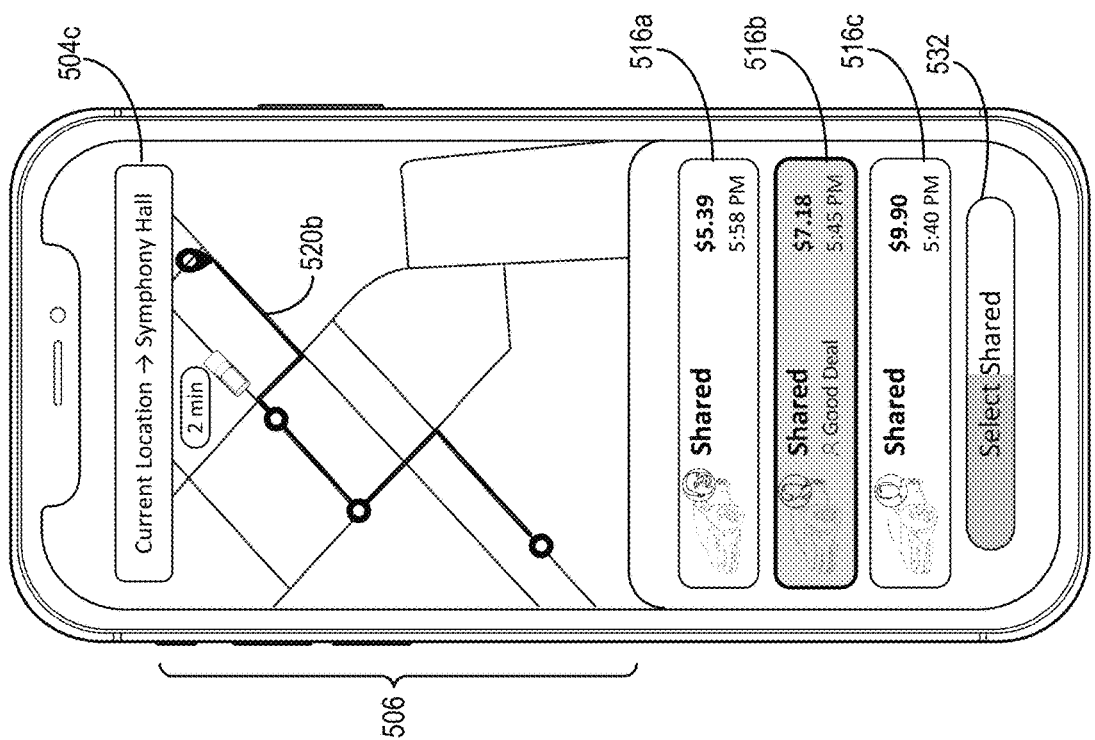

PROVIDING EPHEMERAL-TRANSPORTATION OPTIONS IN REAL TIME FOR SHARING ACTIVE TRANSPORTATIONS

BACKGROUND

Ride sharing systems commonly use web and mobile applications to manage on-demand requests for transportation from providers. By using such web applications and mobile applications, on-demand ride sharing systems pair providers with requestors to transport such requestors from pickup locations to drop-off locations. To initiate transportation and requestor-provider matching, requestors generally specify a pickup location and a drop-off location as part of a transportation request. In some cases, on-demand ride sharing systems can provide the requestor with an option to request a shared transportation, where the requestor travels along part or all of the route from the specified pickup location to the specified drop-off location with a second requestor in the same transportation vehicle. For example, in response to receiving a request to share transportation with another requestor, on-demand ride sharing systems can search for an appropriate upcoming transportation and match the received request to the identified upcoming transportation.

While shared transportation often presents vehicle-use efficiencies and savings, shared transportation is systematically problematic in several regards. For example, conventional ride sharing systems often rely on a static computational model that rigidly applies a matching algorithm. For example, such a static computational model may apply a matching algorithm that identifies shared vehicles and/or transportations only after receiving a shared transportation request. Such a static computational model may further require a rigid timing window within which a vehicle must coordinate pick up of multiple requestors for shared transportation.

Even when conventional ride sharing systems respond to a shared transportation request, these systems often communicate vague and inaccurate ride-sharing details within graphical user interfaces. Because conventional systems use static computational models that consume excessive time and resources to find a match, some conventional systems generally provide shared-transportation-match information to a requestor device with little to no information regarding route and estimated time of arrival—because the systems cannot determine such information prior to making a specific match between shared requestors and a vehicle. While some conventional systems provide a cost estimate as part of shared-transportation-match information with a requestor device, such conventional systems often provide a historical average-cost estimate that can lack accuracy by averaging the historically based cost of past shared rides along one or more potential routes from the requestor's current location to a specified drop-off location. Moreover, when a requestor selects a conventionally provided shared transportation match, the conventional system often surfaces a shared-ride option in a user interface for a requestor with vague time ranges for a vehicle picking up the requestor at a pickup location or dropping off the requestor at a drop-off location.

In addition to a static computational model on backend servers for matching shared transportation, conventional ride sharing systems often use rigid client-device models for presenting shared transportation options in graphical user interfaces. As mentioned above, conventional systems typically perform matches (both shared and non-shared) in response to receiving transportation requests. But matching a shared ride request only in response to receiving the shared ride request is an inflexible solution that leads to other inefficiencies.

To illustrate, because of the inefficiencies common to conventional systems described above, conventional systems further utilize a siloed-approach in providing graphical user interfaces to client devices. For example, once a requestor selects a shared-transportation option, conventional systems sometimes provide only information and user interfaces to the client device of that requestor that are specific to shared transportation. Similarly, once a requestor selects a non-shared-transportation option, conventional systems sometimes provide only information and user interfaces that are specific to non-shared transportation.

To overcome this inflexibility, some conventional systems provide options for requestor devices to back out of certain series of interfaces so that requestors can change parameters and/or cancel transportation matches. But this jerry-rigged solution further waste computing resources. For example, by only enabling the reconfiguring of a transportation request (e.g., from non-shared to shared) in response to backing up through several interfaces on the requestor's client device, conventional systems often require excessive user interactions with graphical displays of the requestor device. Conventional systems can also waste computing resources in canceling and reissuing transportation requests associated with the same requestor, the same pickup location, and the same drop-off location. Together, conventional systems sometimes exchange an excessive number of back-and-forth data transmissions to accommodate the backing up, reconfiguring, resubmitting, and re-matching associated with a change in transportation type associated with a requestor's client device.

BRIEF SUMMARY

This disclosure describes embodiments of systems, non-transitory computer-readable media, and methods that solve the foregoing problems in addition to providing other benefits. In particular, the disclosed systems can detect a potential (or active) shared transportation request from a new requestor's device and an ongoing (or otherwise active) transportation for an existing requestor by a vehicle and then extemporaneously generate an ephemeral-transportation option for display on the new requestor's device to share the ongoing transportation by the vehicle. For example, the disclosed systems can intelligently analyze signals from a new requestor's device to detect a pickup location and a drop-off location of the new requestor—either before or after receiving a shared transportation request. In some such cases, the disclosed system can identify a pickup location or a drop-off location input by the new requestor into the new requestor's device. The disclosed systems can further identify an active transportation by a vehicle of an existing requestor traveling along a route projected to pass nearby the pickup or drop-off locations detected from a transportation history or signals of the new requestor's device. Based on the detected pickup and drop-off locations, the disclosed systems match the new requestor with the active transportation by the vehicle for the existing requestor. Upon matching the new requestor to the active transportation, the disclosed systems provide the new requestor's device with an ephemeral-transportation option—which may expire after a predetermined time—for the new requestor to share the active transportation with the existing requestor.

BRIEF DESCRIPTION OF THE DRAWINGS

The detailed description refers to the drawings briefly described below.

FIG. 4 illustrates a sequence diagram of the transportation sharing system generating and providing an ephemeral-transportation option in accordance with one or more embodiments.

FIGS. 5A-5G illustrate example graphical user interfaces provided or generated by the transportation sharing system in accordance with one or more embodiments.

DETAILED DESCRIPTION

Figure 1:
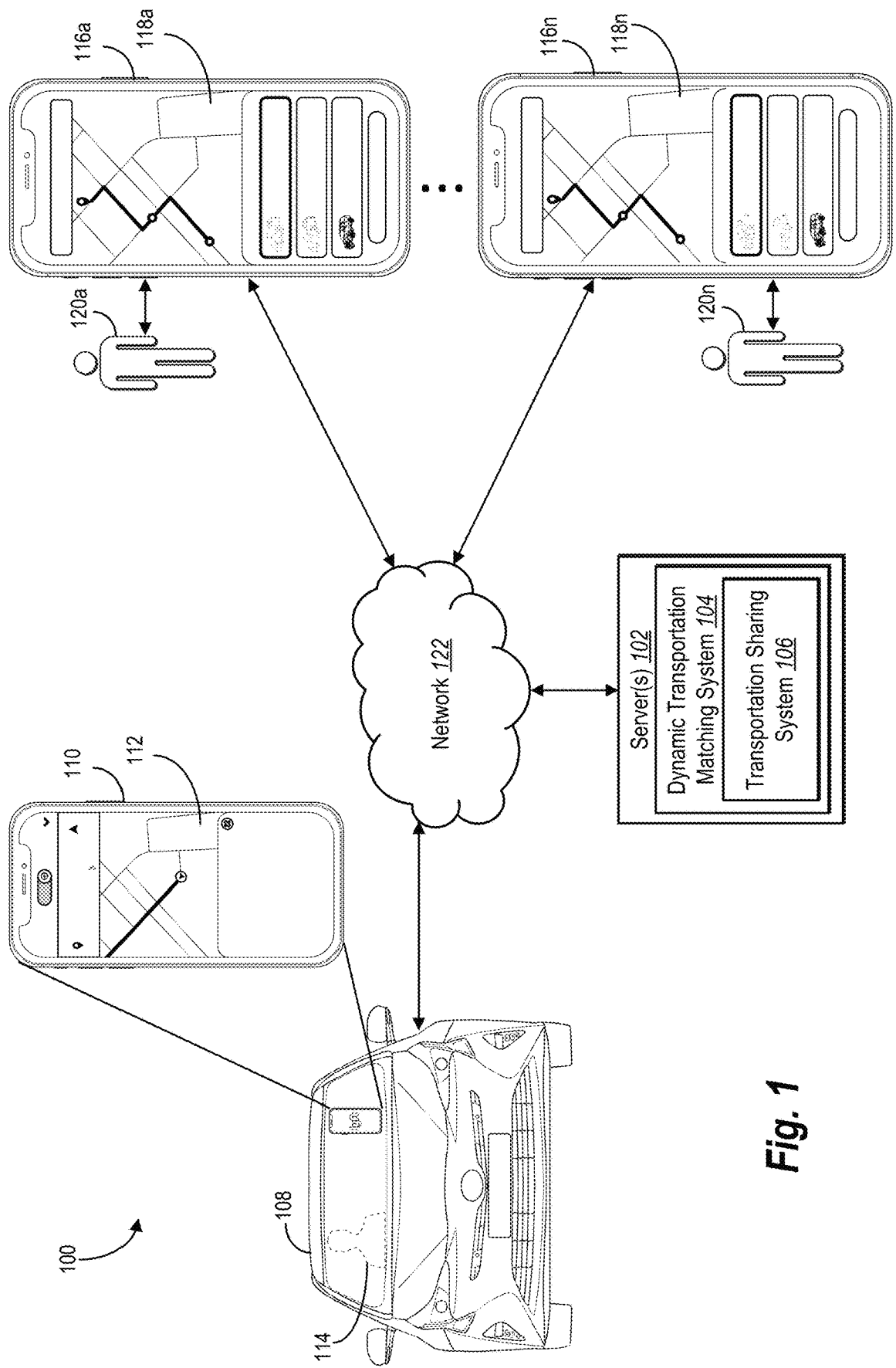
FIG. 1 illustrates an example environment in which a dynamic transportation matching system and a transportation sharing system operate in accordance with one or more embodiments.

This disclosure describes one or more embodiments of a transportation sharing system that intelligently matches a new requestor with an active transportation by a vehicle of an existing requestor—based on pickup and drop-off locations detected from the new requestor's device, location, or history—and provides an ephemeral-transportation option for display on the new requestor's device to share the active transportation by the vehicle. For example, the transportation sharing system can (i) detect pickup and drop-off location information associated with a new requestor's device and (ii) match the new requestor with an active transportation by a vehicle of an existing user based at least in part on a correspondence between the detected pickup and drop-off locations and a route of the active transportation. In some such cases, the disclosed system determines that adding the detected pickup location or drop-off location to the active transportation will satisfy (or not exceed) a threshold of additional travel time. Based on matching the new requestor with the active transportation, the transportation sharing system can provide an ephemeral-transportation option for display on the new requestor's device to share the active transportation with the existing requestor. In some embodiments, the transportation sharing system can perform the match and provide the ephemeral-transportation option before receiving a shared transportation request from the new requestor's device.

In response to detecting a selection of the ephemeral-transportation option prior to expiration of the ephemeral-transportation option, in some embodiments, the transportation sharing system adjusts a route of the vehicle assigned to the active transportation to include the pickup and drop-off locations of the new requestor. If the transportation sharing system detects no selection of the ephemeral-transportation option prior to the option expiring, in certain implementations, the transportation sharing system removes the ephemeral-transportation option from display on the new requestor's device.

As suggested above, in one or more embodiments, the transportation sharing system detects a pickup location and a drop-off location associated with a new requestor's device. For example, the transportation sharing system can detect pickup and drop-off locations associated with a new requestor based on session events in an active application session on the new requestor's client device. Such session events can include, for example, the transportation matching application opening on the new requestor's client device, a detected selection of a drop-off location, or the detected configuration of other user preferences.

Additionally or alternatively, the transportation sharing system can detect pickup and drop-off locations based on the new requestor's activity history. For example, the transportation sharing system can detect and analyze historical transportation data associated with the new requestor's transportation requests to determine whether the new requestor requests transportation including the same or similar pickup locations, drop-off locations, and request times. Based on analyzing the historical transportation data, the transportation sharing system can determine a use pattern associated with the new requestor. Based on a time and location of the new requestor's device, the transportation sharing system can further detect likely pickup and drop-off locations and request times associated with the new requestor.

As also noted above, in one or more embodiments, the transportation sharing system can detect an active transportation by a transportation vehicle associated with an existing requestor. For example, the transportation sharing system can utilize positioning data (e.g., Global Positioning System ("GPS") data) in connection with active transportation data to detect the location, speed, and direction associated with a vehicle transporting the existing requestor or traveling towards the existing requestor's pickup location. By analyzing both the vehicle's positioning data in combination with the transportation data associated with the existing requestor (e.g., the pickup and drop-off locations for the current transportation of the existing requestor), the transportation sharing system can determine a route of the active transportation and a position of the transportation vehicle along that route.

Based on detecting information about an active transportation and the pickup and drop-off locations of the new requestor, the transportation sharing system can match the new requestor with the active transportation by the transportation vehicle associated with the existing requestor. For example, the transportation sharing system can match the new requestor with the active transportation based on determining that adding the new requestor's pickup and drop-off location to the route of the active transportation will not cause an unreasonable amount of travel time delay to the active transportation associated with the existing requestor. The transportation sharing system can make this determination based on a travel time associated with the active transportation of the existing user in addition to the travel time associated with adjusting the route of the active transportation to include one or both of the pickup and drop-off locations associated with the new requestor.

Upon identifying a match with an active transportation by a transportation vehicle, in one or more embodiments, the transportation sharing system can provide an ephemeral-transportation option for display on the new requestor's device for the new requestor to share the active transportation with the existing requestor. For example, the transportation sharing system can provide the ephemeral-transportation option in a graphical user interface that includes an indication of the provider of the transportation vehicle associated with the active transportation, a graphical representation of a route for the transportation vehicle to transport the new requestor and the existing requestor, an estimated time of arrival of the transportation vehicle at the drop-off location of the new requestor, and/or a price for transporting the new requestor from the pickup location to the drop-off location. The transportation sharing system can further provide the ephemeral-transportation option in addition to other transportation options (e.g., non-shared options for individual transport) or multiple ephemeral-transportation options, where each option is associated with a different active transportation of other existing requestors.

As suggested above, the transportation sharing system can provide an ephemeral-transportation option for display on a client device and remove the option after a threshold amount of time. For example, depending on the speed and location of the transportation vehicle, the transportation sharing system can provide the ephemeral-transportation option on the new requestor's device for a threshold amount of time to allow the new requestor a threshold selection time to see and accept the ephemeral-transportation option and a provider device a threshold adjustment time to receive notifications of an adjusted route. In some cases, the transportation sharing system configures the threshold selection time to allow the new requestor time to consider the ephemeral-transportation option. The transportation sharing system further configures the threshold adjustment time to allow the provider associated with the transportation vehicle to make any route diversions or changes to arrive at the pickup location of the new requestor. Once the threshold amount of time associated with the ephemeral-transportation option expires, the transportation sharing system can remove the ephemeral-transportation option from display on a requestor client device of the new requestor.

In one or more embodiments, the transportation sharing system can perform additional analyses in determining whether to provide the ephemeral-transportation option to the new requestor. For example, the transportation sharing system can identify user activity associated with the new requestor to determine a likelihood score indicating a likelihood that the new requestor will select the ephemeral-transportation option. The transportation sharing system can identify historical transportation data including whether the new requestor has previously selected other ephemeral-transportation options, how often the new requestor requests transportation, and the average cost associated with transportation previously taken by the new requestor. Based on this historical transportation data, the transportation sharing system can determine a likelihood that the new requestor will select the current ephemeral-transportation option. The transportation sharing system can make this likelihood determination after matching the new requestor with the active transportation by the transportation vehicle associated with the existing requestor. Additionally or alternatively, the transportation sharing system can make this likelihood determination after detecting the pickup location and drop-off location associated with the new requestor and prior to matching the new requestor with the active transportation.

As mentioned above, some conventional ride sharing systems rely on static computational models and rigid algorithms that identify shared transportation only in response to receiving a shared transportation request. By matching requestors and provider for shared transportation only in response to receiving a shared transportation request, however, conventional systems tend to consume more computing resources than necessary to identify upcoming transportation for shared transportation. For instance, by enforcing a rigid ordering in a matching algorithm relative to receiving and then matching shared transportation requests, conventional systems waste computing resources because the received shared transportation requests remain in stored on servers or databases for buffer periods and can exponentially add potential matches to computational-intensive calculations for matching.

In addition to inefficiently using computing resources, conventional ride sharing systems often generate shared transportation options or matches with vague or missing details. In some cases, conventional systems cannot provide information requestors typically receive as part of a non-shared transportation match, such as route and estimated time of arrival. Nor can conventional systems provide an accurate cost estimate for shared transportation options, but rather a historical average-cost estimate of past shared rides along one or more potential routes from a requestor's current location to a specified drop-off location. Conventional systems can also provide shared transportation options or matches within rigid and siloed series of graphical user interfaces that are specific to only one type of transportation option or match (e.g., shared-option user interfaces versus non-shared-option user interfaces). By providing only one type of transportation match at a time, conventional systems create additional inflexibilities and invite further computational waste by forcing requestor devices to back up through series of interfaces to cancel transportation matches and reconfigure requests with reference to other transportation types.

In comparison to conventional systems, the transportation sharing system improves the efficiency, flexibility, and accuracy with which a ride sharing system provides shared transportation options. Rather than the rigid computational models of conventional systems that delay matching until after a shared transportation request is received, for example, the transportation sharing system efficiently matches a likely transportation request to an active transportation of an existing requestor based on a detected pickup or drop-off location and/or a route of the active transportation. In other words, in certain implementations, the transportation sharing system generates a "ghost" match in response to detecting a pickup location associated with a new requestor client device rather than in response to receiving a completed, shared transportation request. By utilizing this ghost-matching approach, the transportation sharing system introduces a dynamic computational model that allows for instantaneous matching of shared transportation requests and real-time surfacing of shared transportation options. Thus, the transportation sharing system avoids the problems common to the slow and rigid computational model utilized by conventional systems that match a received shared transportation request to an upcoming transportation. As described below, in some embodiments, the transportation sharing system implements an ordered combination of steps using unconventional rules to do something conventional systems cannot do—that is, extemporaneously provide or surface an ephemeral-transportation option for shared transportation.

In comparison to conventional ride sharing systems, in certain embodiments, the transportation sharing system generates more accurate and specific information about shared transportation options in user interfaces—upon a requestor device accessing a client-device application or initially requesting shared transportation. Because the transportation sharing system matches the new requestor to an active transportation based on detected pickup and drop-off locations and/or a route of the active transportation, the transportation sharing system can provide match information concerning a provider and a route to the new requestor's device that is both accurate and specific for shared transportation. For example, the transportation sharing system can provide match information that identifies a provider associated with the active transportation, the route associated with the active transportation, a specific time of arrival, and a transportation cost. By contrast, conventional ride sharing systems often cannot specifically identify a provider, vehicle, route, time, or cost for shared transportation options—upon a requestor device accessing a client-device application or initially requesting shared transportation.

In addition to improved speed or accuracy, in certain embodiments, the transportation sharing system also detects active transportations and presents ephemeral-transportation options in real time by integrating location and position data from GPS devices to determine matches between new requestors and active transportations. In contrast to conventional ride sharing systems that rigidly execute static computational models that match new requestors only after a shared transportation request is received, in certain embodiments, the transportation sharing system utilizes signals and other data from the new requestor's device in connection with real-time location and position data of providers associated with nearby active transportations to match the new requestor to one or more active transportations. Specifically, in some embodiments, the transportation sharing system can integrate the location data (e.g., the GPS signals from GPS devices) of both the new requestor's client device and the client devices of one or more provider's into matching analyses to determine whether matching the new requestor with the associated active transportations will result in changes that satisfy a threshold amount of additional travel time.

Moreover, rather than locking a requestor into a siloed series of graphical user interfaces specific to only one type of transportation (e.g., shared versus non-shared), in some implementations, the transportation sharing system generates and provides a single, flexible interface that includes ephemeral-transportation options associated with shared transportation in addition to other types of transportation options generated by a dynamic transportation matching system. For example, the dynamic transportation matching system can generate and provide data for a graphical user interface comprising transportation options for non-shared transportation at different levels (e.g., standard, luxury), as well as one or more ephemeral-transportation options. Thus, the transportation sharing system avoids excessive interface interactions common to conventional systems that often require users to back out of a series of interfaces to reconfigure a transportation request to include a different transportation type.

As illustrated by the foregoing discussion, the present disclosure utilizes a variety of terms to describe features and advantages of the transportation sharing system. For example, as used herein, the term "transportation request" refers to a request from a requesting individual (i.e., a requestor) for transport by a transportation vehicle. In particular, a transportation request includes a request for a transportation vehicle to transport a requestor or a group of individuals from one geographic area to another geographic area. The transportation request can include data associated with a requestor client device, including a request location (e.g., a location from which the transportation request is initiated), a destination (e.g., a location to which the requestor wishes to travel), a pickup location or a drop-off location where a requestor can be respectively picked up for transportation or dropped off from transportation (where the geographic areas may be the same as or different from the request location and destination), a transportation mode or type (e.g., shared versus non-shared), location profile information, a requestor rating, historical transportation data, a search history, etc. In some cases, a drop-off location constitutes and is the same as a destination. Additionally, or alternatively, a transportation request can include a request to be transported in certain manner (e.g., according to a service category type, such as standard, premium, luxury, shared, shared saver, wheel-chair accessible, etc.).

As suggested above, the term "transportation provider" (or "provider") refers to a driver or other person who operates a transportation vehicle and/or who interacts with a provider client device, on the one hand, or an autonomous vehicle, on the other hand. For instance, a transportation provider includes a person who drives a transportation vehicle along various transportation routes—or an autonomous vehicle that drives along such transportation routes—to pick up and drop off requestors.

As suggested above, the term "transportation requestor" (or "requestor") refers to a person who submits (or is projected to submit) a transportation request to a dynamic transportation matching system and/or who interacts with a requestor client device. For instance, a transportation requestor includes a person who interacts with a requestor client device to send a transportation request to a dynamic transportation matching system. After the dynamic transportation matching system matches a requestor with a provider, the requestor can await pickup by the provider at a predetermined pickup location. Upon arrival of the provider, the requestor can engage with the provider by getting into a transportation vehicle associated with the provider for transport to a drop-off location specified in the requestor's transportation request. Accordingly, a requestor may refer to (i) a person who requests a ride or other form of transportation but who is still waiting for pickup or (ii) a person whom a transportation vehicle has picked up and who is currently riding within the transportation vehicle to a destination. As further utilized herein, an "existing requestor" refers to a requestor who has already been matched to a specific provider, and a "new requestor" refers to a requestor who has not been matched to a specific provider. As described herein, a new requestor may be added to an active transportation by a transportation vehicle of an existing requestor.

As suggested above, the term "active transportation" refers to an ongoing transportation of a requestor within a transportation vehicle or a transportation assigned or matched with a requestor to which a transportation vehicle is traveling (or for which a provider has accepted a request) to pick up. Accordingly, an active transportation can include a provider operating a transportation vehicle to a pickup location of the requestor (e.g., prior to the requestor entering the transportation vehicle). Additionally, an active transportation can include the requestor traveling in the transportation vehicle after pickup. In one or more embodiments, an active transportation begins when a provider either accepts or is notified of a transportation request match, and ends when the provider drops the matched requestor of at the drop-off location specified by the transportation request.

In at least one embodiment, an active transportation follows a route. As used herein, the term "route" refers to a path of travel to or from a location, such as from one location to another location. For example, a route can refer to a predefined path from a provider's current location to a pickup location of a requestor and from the pickup location to a drop-off location. As described below, routes can include an initial or a projected transportation route (e.g., an estimated route for transporting one or more requestors), an adjusted route (e.g., a route different than or modified from an initial route), etc.

As further suggested above, in some embodiments, a route is associated with a travel time. As used herein, the term "travel time" refers to an amount of time for a vehicle or requestor to travel from one location to another location, including or excluding waypoints. For example, in some cases, the travel time associated with an active transportation along a route refers to an amount of time for the transportation vehicle to move from a current location on the route to a destination (e.g., the drop-off location).

As further used herein, the term "ephemeral-transportation option" refers to an option for a vehicle to transport a requestor that is presented on (or provided to) a requestor client device for a threshold amount of time. For instance, an ephemeral-transportation option can include a selectable option presented on a graphical user interface to share transport by a transportation vehicle with another requestor. As described further below, an ephemeral-transportation option can include or be provided in a graphical user interface including a provider indicator for a provider of the transportation vehicle, a graphical representation of a route for the transportation vehicle, an estimated time of arrival of the transportation vehicle at a drop-off location, and/or a price associated with the transportation.

Additionally, as described further below, the threshold amount of time during which the transportation sharing system provides the ephemeral-transportation option can depend on the speed, location, and direction of the matched transportation vehicle along the route associated with the active transportation. For example, the transportation sharing system can determine a variable threshold amount of time during which an ephemeral-transportation option is valid. Once the threshold amount of time expires, the transportation sharing system can remove the ephemeral-transportation option from the requestor client device.

Turning now to the figures, FIG. 1 illustrates a schematic diagram of an environment 100 for implementing a transportation sharing system 106 in accordance with one or more embodiments. As shown in FIG. 1, the environment 100 includes server(s) 102 comprising a dynamic transportation matching system 104 and the transportation sharing system 106, a transportation vehicle 108, a provider client device 110 corresponding to the transportation vehicle 108, requestor client devices 116a-116n respectively corresponding to requestors 120a-120n, and a network 122. For ease of explanation, this disclosure refers to an existing requestor client device 116a associated with an existing requestor 120a and a new requestor client device 116n associated with a new requestor 120n—when referring to a single requestor client device or a single requestor illustrated in FIG. 1 or other figures. In some embodiments, the transportation vehicle 108 optionally includes a provider 114. The provider 114 in this example is a human provider associated with both the transportation vehicle 108 and the provider client device 110.

As shown, in one or more embodiments, the transportation sharing system 106 can be a component of the dynamic transportation matching system 104 implemented on one or more of the server(s) 102. In these or other embodiments, the transportation sharing system 106 may perform one or more acts of the present disclosure described in conjunction with the dynamic transportation matching system 104. Additionally, or alternatively, the dynamic transportation matching system 104 may perform one or more acts of the present disclosure described in conjunction with the transportation sharing system 106. Furthermore, although FIG. 1 depicts the transportation sharing system 106 and the dynamic transportation matching system 104 as distinct systems, the transportation sharing system 106 can be implemented in whole or in part by the dynamic transportation matching system 104, and vice-versa.

As indicated by FIG. 1, the dynamic transportation matching system 104 uses the server(s) 102 to communicate with one or both of the provider client device 110 and the requestor client devices 116a-116n via the network 122. For example, the dynamic transportation matching system 104 communicates with the provider client device 110 and the requestor client devices 116a-116n via the network 122 to determine locations of the provider client device 110 and the requestor client devices 116a-116n, respectively. Per device settings, for instance, the dynamic transportation matching system 104 may receive location coordinates from the provider client device 110 and/or the requestor client devices 116a-116n, respectively. Based on the location coordinates, the dynamic transportation matching system 104 matches or assigns the transportation vehicle 108 with one or more of the requestors 120a-120n for transportation.

As suggested above, each of the provider client device 110 and the requestor client devices 116a-116n may comprise a mobile device, such as a laptop, smartphone, or tablet associated with a requestor or a provider. The provider client device 110 and the requestor client devices 116a-116n may be any type of computing device as further explained below with reference to FIG. 10. In some embodiments, the provider client device 110 is not associated with a provider, but is attached to (or integrated within) the transportation vehicle 108.

As further indicated by FIG. 1, the provider client device 110 includes a provider application 112. Similarly, the requestor client devices 116a-116n include requestor applications 118a-118n, respectively. In some embodiments, the provider application 112 (or the requestor applications 118a-118n) comprise web browsers, applets, or other software applications (e.g., native applications) respectively available to the provider client device 110 or the requestor client devices 116a-116n. Additionally, in some instances, the dynamic transportation matching system 104 provides data including instructions that, when executed by the provider client device 110 or by the requestor client devices 116a-116n, respectively create or otherwise integrate one of the provider application 112 or the requestor applications 118a-118n with an application or webpage.

As further indicated by FIG. 1, a requestor may use a requestor application to receive an ephemeral-transportation option, request transportation services, receive a price estimate for the transportation service, edit a transportation request, or access other transportation-related services. For example, in some cases, an existing requestor 120a may interact with the existing requestor client device 116a through graphical user interfaces of the requestor application 118a to configure and submit a transportation request. The dynamic transportation matching system 104 can match the transportation request to the provider client device 110, and provide route instructions to the provider 114 via the provider application 112. During the active transportation of the existing requestor 120a, the transportation sharing system 106 may provide an ephemeral-transportation option associated with the active transportation of the new requestor 120a to the requestor application 118n on the new requestor client device 116n (e.g., based on detected interactions with the requestor application 118n and prior to receiving a transportation request from the new requestor 120n). If the new requestor 120n selects the ephemeral-transportation option prior to its expiration, the dynamic transportation matching system 104 can adjust a route of the active transportation of the existing requestor 120a to include a pickup location and a drop-off location associated with the new requestor 120n. In other words, as used herein, the existing requestor 120a refers to the requestor whose transportation is shared with the new requestor 120n, and the new requestor 120n refers to the requestor who is matched or added to an active transportation of the existing requestor 120a.

As further depicted in FIG. 1, the dynamic transportation matching system 104 sends route guidance and/or other notifications to the provider client devices 110 within the transportation vehicle 108. While FIG. 1 depicts the transportation vehicle 108 as an automobile, a transportation vehicle may also be an airplane, bicycle, motorcycle, scooter, or other vehicle. In some cases, this disclosure describes a transportation vehicle as performing certain functions, but such a transportation vehicle includes an associated provider client device that often performs a corresponding function. For example, when the dynamic transportation matching system 104 sends a transportation match to the transportation vehicle 108—or queries location information from the transportation vehicle 108—the dynamic transportation matching system 104 sends the transportation match or location query to the provider client device 110. Accordingly, the transportation vehicle 108 and the provider client device 110 are part of a vehicle subsystem.

Although not illustrated in FIG. 1, in some embodiments, the environment 100 may have a different arrangement of components and/or may have a different number or set of components altogether. In certain implementations, for instance, the transportation vehicle 108 does not include a human provider, but constitutes an autonomous transportation vehicle—that is, a self-driving vehicle that includes computer components and accompanying sensors for driving without manual-provider input from a human operator. As a further example, in some embodiments, the transportation vehicle 108 includes a hybrid self-driving vehicle with both self-driving functionality and some human operator interaction.

When a transportation vehicle is an autonomous vehicle or a hybrid self-driving vehicle, the transportation vehicle may include additional components not depicted in FIG. 1. Such components may include location components, one or more sensors by which the autonomous vehicle navigates, and/or other components necessary to navigate without a provider (or with minimal interactions with a provider). Regardless of whether a transportation vehicle is associated with a provider, a transportation vehicle optionally includes a locator device, such as a GPS device, that determines the location of the transportation vehicle within the transportation vehicle 108.

As mentioned above, the transportation vehicle 108 includes the provider client device 110 as separate from or integral to the transportation vehicle 108. Additionally, or alternatively, the provider client device 110 may be a subcomponent of a vehicle computing system. Regardless of its form, the provider client device 110 may include various sensors, such as a GPS locator, an inertial measurement unit, an accelerometer, a gyroscope, a magnetometer, and/or other sensors, from which the dynamic transportation matching system 104 can access information, such as location information.

In some embodiments, the dynamic transportation matching system 104 communicates with the provider client device 110 through the provider application 112. For instance, the provider application 112 can cause the provider client device 110 to communicate with the dynamic transportation matching system 104 to navigate to a pickup location to pick up a requestor; navigate to a pickup location to pick up a shared requestor; navigate to a drop-off location; identify a change in drop-off location, route, or waypoint; and/or collect fares. In some cases, the provider application 112 causes the provider client device 110 to communicate with the dynamic transportation matching system 104 to receive and present an altered or adjusted route to include pickup and drop-off locations of a new requestor, as described further below.

Figure 2:
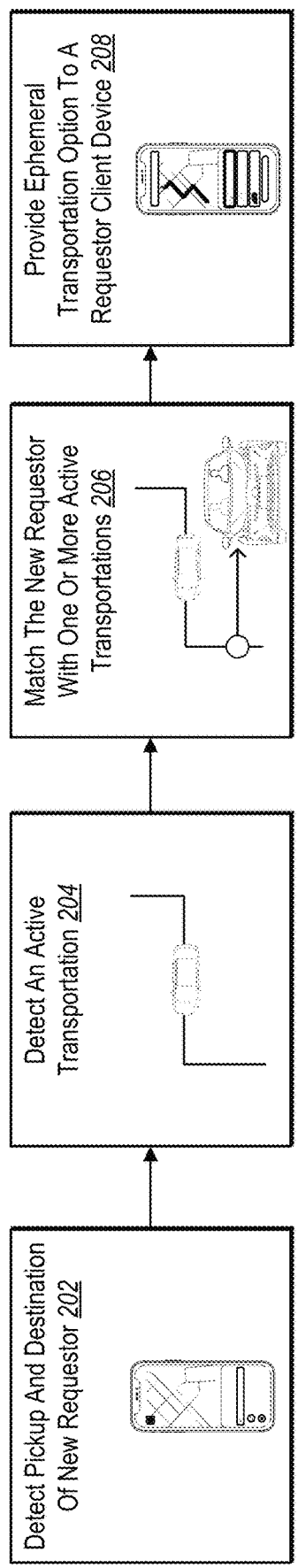
FIG. 2 illustrates an overview of the transportation sharing system determining whether to match a new requestor with an active transportation of an existing requestor and (if such a match is determined) generating one or more ephemeral-transportation options to share the active transportation in accordance with one or more embodiments.

FIG. 2 illustrates an overview of the transportation sharing system 106 determining whether to match a new requestor with an active transportation of an existing requestor and generating one or more ephemeral-transportation options in accordance with one or more embodiments. As depicted for an act 202, for example, the transportation sharing system 106 can detect a pickup and destination associated with a new requestor to trigger the match determination associated with the new requestor and at least one active transportation. As illustrated for acts 204 and 206, the transportation sharing system 106 can further detect an active transportation that corresponds with the pickup and drop-off locations of the new requestor and match the new requestor with one or more active transportations. Finally, as depicted for an act 208, the transportation sharing system 106 can provide an ephemeral-transportation option to the new requestor device associated with the match.

As shown in FIG. 2, for example, the transportation sharing system 106 performs the act 202 of detecting a pickup location and a destination location of a new requestor. To illustrate, the transportation sharing system 106 can detect one or more session events from an active requestor application on a requestor client device associated with the new requestor (e.g., the new requestor 120n utilizing the requestor application 118n on the new requestor client device 116n). As will be discussed below with reference to FIG. 4, such session events can include the new requestor opening the requestor application and inputting or otherwise configuring a pickup location or a drop-off location (e.g., a destination). Based on the detected session events, the transportation sharing system 106 can detect pickup and drop-off locations selected by the new requestor, or pickup and drop-off locations likely to be selected by the new requestor.

Additionally or alternatively, the transportation sharing system 106 can detect a pickup location and drop-off location associated with the new requestor based on historical transportation data associated with the new requestor. For example, as will be discussed below with reference to FIG. 4, the transportation sharing system 106 can analyze historical transportation data associated with the new requestor to determine that the new requestor is likely to request transportation from a particular pickup location to a particular drop-off location at a particular time. The transportation sharing system 106, for example, can utilize behavioral modeling to identify a pattern of use associated with the new requestor.

As further shown in FIG. 2, the transportation sharing system 106 performs the act 204 of detecting an active transportation. For example, as mentioned above, an active transportation can include a transportation vehicle transporting an existing requestor or a transportation vehicle traveling to a pickup location of an existing requestor—after a provider accepts a transportation request by the existing requestor. Accordingly, the active transportation can include a transportation vehicle transporting the existing requestor from the pickup location to a drop-off location.

In one or more embodiments, the transportation sharing system 106 detects one or more active transportations associated with routes that are nearly or otherwise correspond to one or more of the pickup location and the drop-off location of the new requestor. For example, the transportation sharing system 106 can determine that the pickup and drop-off locations of a new requestor are on the route of an active transportation of an existing requestor. Additionally, the transportation sharing system 106 can determine that the pickup and drop-off locations are near locations along a route that would not cause undue travel time delay if added to an adjusted route of an active transportation of an existing requestor.

After detecting an active transportation, the transportation sharing system 106 performs the act 206 of matching the new requestor to one or more of the detected active transportations. For example, the transportation sharing system 106 can match the new requestor to an active transportation based on the pickup and drop-off locations of the new requestor being located on a route of the active transportation. Additionally or alternatively, the transportation sharing system 106 can match the new requestor to an active transportation in response to determining that the travel time of an adjusted route that includes the pickup and drop-off locations of the new requestor will not exceed a threshold amount of additional travel time beyond the travel time associated with the initial route of the active transportation of the existing requestor.

In some embodiments, the transportation sharing system 106 can take additional factors into account when matching the new requestor to an active transportation of an existing requestor. For example, in certain implementations, the transportation sharing system 106 can determine a likelihood score or model output that indicates a likelihood that the new requestor will select an ephemeral-transportation option associated with a match to the active transportation of the existing requestor. For instance, and as will be discussed below with reference to FIG. 4, the transportation sharing system 106 can base the likelihood score on the new requestor's transportation preferences and the new requestor's historical transportation data—including information associated with ephemeral-transportation options selected by the new requestor in the past.

As further shown in FIG. 2, after matching the new requestor with an active transportation, the transportation sharing system 106 performs the act 208 of providing an ephemeral-transportation option to a requestor client device. For example, the transportation sharing system 106 can generate data for the ephemeral-transportation option to include information associated with the route of the active transportation or an adjusted route of the active transportation, information associated with the provider of the transportation vehicle, an estimated time of arrival, and a specific cost of transportation. Moreover, the transportation sharing system 106 provides the ephemeral-transportation option to the requestor client device prior to any requestor selection "request" or "send" option associated with a transportation request.

As indicated above, the transportation sharing system 106 can provide the ephemeral-transportation option via the requestor client device of the new requestor for a threshold amount of time. As explained below, the threshold amount of time can depend on the speed and position of the transportation vehicle relative to the pickup location of the new requestor. If the new requestor does not select the ephemeral-transportation option within the threshold amount of time, the transportation sharing system 106 can remove the ephemeral-transportation option from a display of the requestor client device. If the new requestor selects the ephemeral-transportation option within the threshold amount of time, the transportation sharing system 106 can update a route for the provider client device in association with the transportation vehicle to include the pickup and drop-off locations associated with the new requestor. The transportation vehicle can further proceed to transport the new requestor and the existing requestor along the initial or adjusted route to the one or more drop-off locations associated with the new and existing requestors.

Figure 3B:
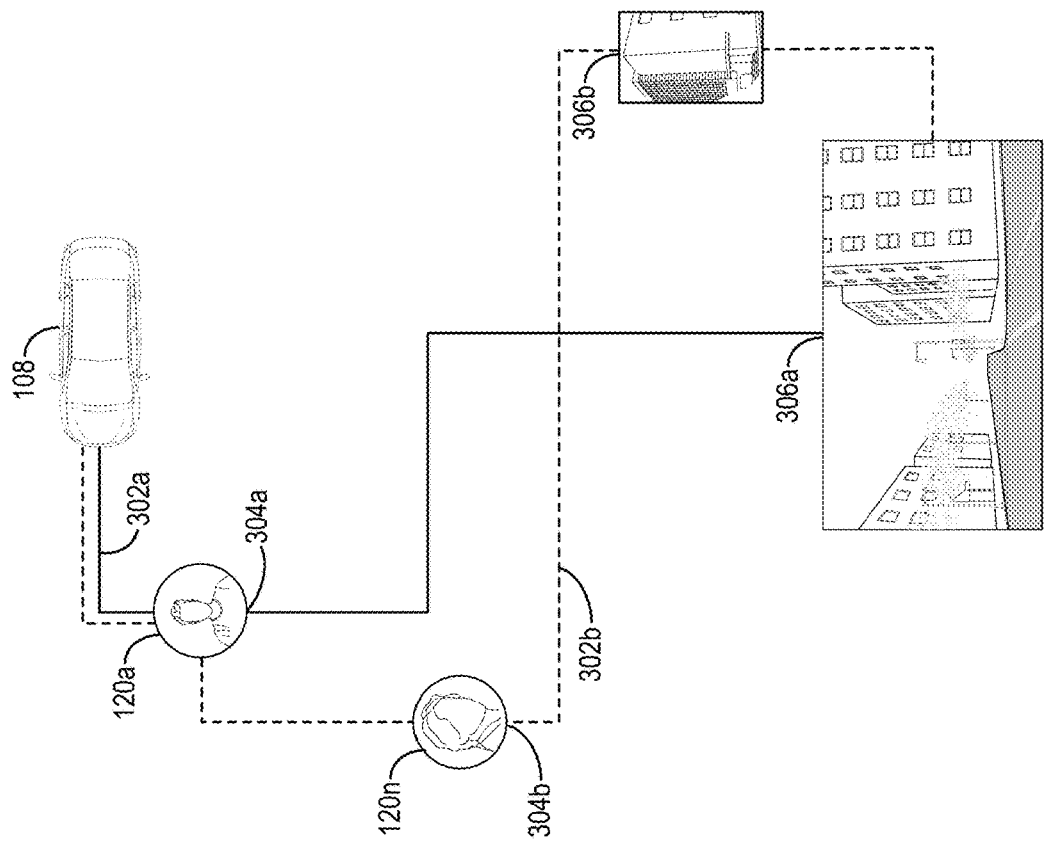
FIGS. 3A and 3B illustrate the transportation sharing system determining whether to match a new requestor with an active transportation of an existing requestor based on pickup and drop-off locations along an initial route or an adjusted route in accordance with one or more embodiments.
Figure 3A:
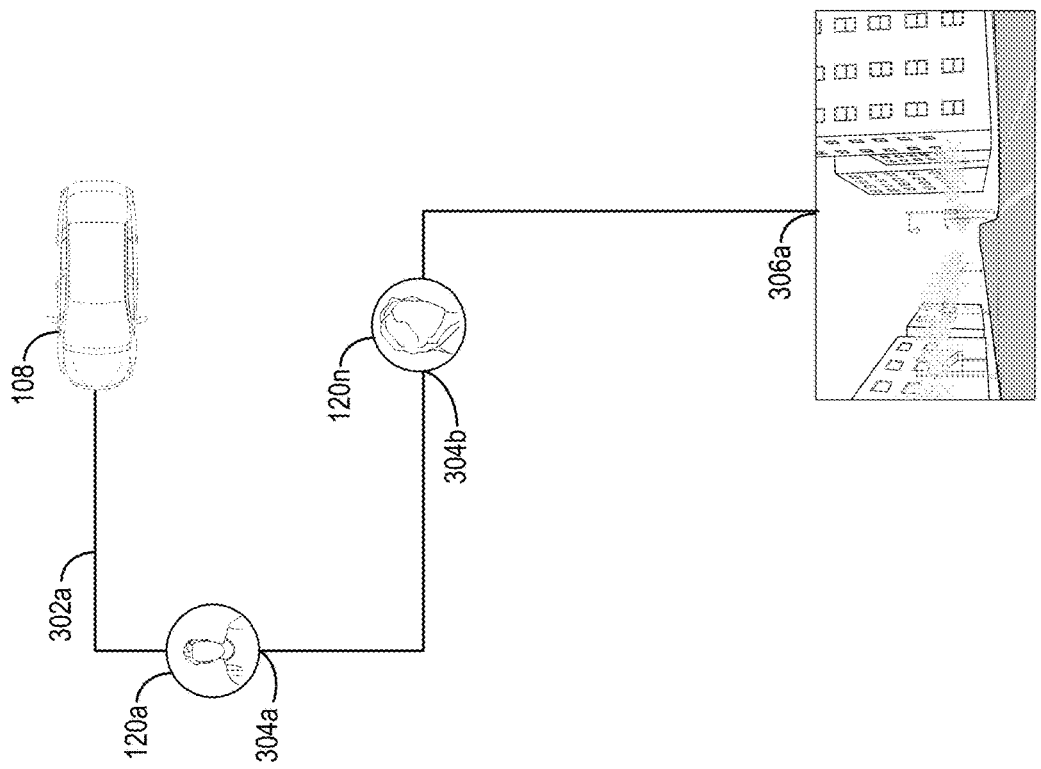

FIGS. 3A and 3B illustrate the transportation sharing system 106 determining whether to match the new requestor 120*n* with the active transportation of the existing requestor 120*a* based on pickup and drop-off locations along an initial route and/or an adjusted route. For instance, in FIG. 3A, the transportation sharing system 106 analyzes the pickup and drop-off locations of the new requestor 120*n* in connection with an initial route 302*a* of the active transportation as part of determining whether to match the new requestor 120*n* with an active transportation. As shown in FIG. 3B, the transportation sharing system 106 analyzes the pickup and drop-off locations of the new requestor 120*n* in connection with an adjusted route 302*b* of the active transportation as part of determining whether to match the new requestor 120*n* with an active transportation. As part of the matching determination, the transportation sharing system 106 determines whether adding the pickup and drop-off locations of the new requestor 120*n* to the initial route 302*a* or to the adjusted route 302*b* will cause the travel time of the existing requestor 120*a* to exceed a threshold amount of additional travel time.

For example, as shown in FIG. 3A, the dynamic transportation matching system 104 can generate a transportation match between a provider (e.g., the provider 114 as shown in FIG. 1) in the transportation vehicle 108 and the requestor 120*a* based on a transportation request received from the existing requestor client device 116*a*. Accordingly, the transportation vehicle 108 can move along the route 302*a* to a pickup location 304*a* associated with the existing requestor 120*a*. As further illustrated in FIG. 3A, the dynamic transportation matching system 104 can generate directions for the route 302*a* to guide the transportation vehicle 108 from a current location to the pickup location 304*a* of the existing requestor 120*a*, and further to a drop-off location 306*a* specified by the transportation request received from the existing requestor client device 116*a*.

After matching the provider associated with the transportation vehicle 108 with the existing requestor 120*a*, the transportation sharing system 106 can detect at least a drop-off location (e.g., the drop-off location 306*a*) associated with the new requestor 120*n*. For example, the transportation sharing system 106 can detect one or more session events from an active requestor application on the requestor application 118*n* of the new requestor client device 116*n*. Additionally or alternatively, the transportation sharing system 106 can detect at least the drop-off location associated with the new requestor 120*n* based on historical transportation data associated with the new requestor 120*n*.

In response to determining one or more correlations between one or both of the pickup and drop-off locations of the new requestor 120*n* and the route 302*a* of the active transportation, the transportation sharing system 106 can match the new requestor 120*n* with the active transportation of the existing requestor 120*a*. For example, the transportation sharing system 106 can match the new requestor 120*n* with the active transportation of the existing requestor 120*a* prior to receiving a transportation request from the new requestor client device 116*n* of the new requestor 120*n*. Additionally, in some embodiments, the transportation sharing system 106 matches the new requestor 120*n* with the active transportation of the existing requestor 120*a* without acceptance or further input from the provider associated with the transportation vehicle 108.

After matching the new requestor 120*n* with the active transportation of the existing requestor 120*a*, the transportation sharing system 106 can provide an ephemeral-transportation option to the existing requestor client device 116*a* associated with the existing requestor 120*a*. For example, and as will be discussed below with regard to FIGS. 5A-6B, the transportation sharing system 106 can provide the ephemeral-transportation option including various information items associated with the transportation vehicle 108, the provider associated with the transportation vehicle 108, the route 302*a*, the estimated time of arrival at the drop-off location 306*a*, and the associated cost of transportation.

In response to detecting a selection of the ephemeral-transportation option by the new requestor 120*n*, the transportation sharing system 106 can notify the provider (e.g., via the provider client device 110) of the pickup location 304*b* of the new requestor 120*n*. For example, based on the speed and location of the transportation vehicle 108 on the route 302*a*, the transportation sharing system 106 can provide updated instructions to the provider client device 110 for the transportation vehicle 108 to stop at the pickup location 304*b* of the new requestor 120*n*. The transportation sharing system 106 can determine to provide these pickup instructions within a threshold adjustment time as the transportation vehicle 108 travels along the route 302*a* so that the provider can safely maneuver the transportation vehicle 108 to the pickup location 304*b*.

For example, if the pickup location 304*b* is two minutes away along the initial route 302*a*, the transportation sharing system 106 can provide the instructions to the provider client device 110 so that the provider 114 associated with the transportation vehicle 108 has at least fifteen seconds to react to the changed instructions (e.g., move to a particular lane, slow down, pull over). In at least one embodiment, the transportation sharing system 106 further pads (or elongates) the threshold adjustment time by up to one or more minutes depending on provider information (e.g., transportation activity, ratings), and current travel conditions (e.g., weather, traffic, road construction). From the pickup location 304*b*, the transportation vehicle can complete transportation of the existing requestor 120*a* and the new requestor 120*n* to the drop-off location 306*a*.

As further shown in FIG. 3A, the new requestor 120*n* can be associated with a pickup location 304*b* and a drop-off location 306*a* that are on the initial route 302*a* associated with the active transportation of the existing requestor 120*a*. Similarly, the new requestor 120*n* can be associated with a drop-off location (e.g., the drop-off location 306*a*) that is identical to the drop-off location of the existing requestor 120*a*. In other embodiments, as shown in FIG. 3B, the new requestor 120*n* may be associated with a pickup location 304*b* and a drop-off location 306*b* that are not directly located on the initial route 302*a* associated with the active transportation of the existing requestor 120*a*. Instead, the pickup location 304*b* and the drop-off location 306*b* are associated with an adjusted route 302*b*.

As shown in FIG. 3B, the dynamic transportation matching system 104 can determine whether to match the new requestor 120*n* with the active transportation of the existing requestor 120*a* based on an analysis of travel time associated with the adjusted route 302*b* versus the initial route 302*a*. For example, in one or more embodiments (and as will be discussed below with regard to FIG. 4), the transportation sharing system 106 will avoid matching the new requestor 120*n* with the active transportation of the existing requestor 120*a*—if the travel time associated with the adjusted route 302*b* exceeds a threshold amount of additional travel time beyond the travel time associated with the initial route 302*a*. This consideration ensures that the active transportation associated with the existing requestor 120*a* is not unduly delayed by adding the additional pickup and drop-off locations associated with the new requestor 120*n* to the active transportation.

For example, as shown in FIG. 3B, the adjusted route 302*b* may move several blocks away from the path of the initial route 302*a* to include the pickup location 304*b* and the drop-off location 306*b* of the new requestor 120*n*. Due to additional considerations relative to the adjusted route 302*b* (e.g., traffic, road work), adding the additional distances included in the adjusted route 302*b* may increase the travel time experienced by the existing requestor 120*a*. If the travel time associated with the adjusted route 302*b* does not exceed the threshold amount of additional travel time for the existing requestor 120*a* (e.g., sixty seconds longer than the travel time associated with the initial route 302*a*), the transportation sharing system 106 will match the new requestor 120*n* to the active transportation of the existing requestor 120*a* and provide an ephemeral-transportation option associated with the match to the requestor device associated with the new requestor 120*n*. If the travel time associated with the adjusted route 302*b* exceeds the threshold amount of additional travel time, the transportation sharing system 106 will not generate the match.

In response to detecting a selection by the new requestor 120*n* of the ephemeral-transportation option within the threshold amount of time, the transportation sharing system 106 can send updated guidance to the provider client device 110 associated with the transportation vehicle 108 to follow the adjusted route 302*b*. As discussed above, in certain cases, the transportation sharing system 106 provides the updated route to the provider client device 110 within a threshold adjustment time sufficient for the provider to safely divert from the route 302a to the adjusted route 302b. For example, depending on the current location of the transportation vehicle 108, the adjusted route 302b can include a portion of the initial route 302a leading to the pickup location 304a of the requestor 120a, and then can divert from the initial route 302a to include the pickup location 304b and the drop-off location 306b of the new requestor 120n, and then end at the drop-off location 306a of the existing requestor 120a.

As mentioned above, the transportation sharing system 106 can generate and provide an ephemeral-transportation option associated with active transportation of an existing requestor. In accordance with one or more embodiments, FIG. 4 illustrates a sequence of acts 400 of the transportation sharing system 106 generating and providing an ephemeral-transportation option for a threshold amount of time. As depicted in the sequence of acts 400, for instance, the transportation sharing system 106 detects at least a drop-off location of a new requestor and matches the new requestor with an active transportation of an existing requestor. As further depicted in the sequence of acts 400, the transportation sharing system 106 can provide an ephemeral-transportation option to the new requestor based on the match. Additionally, as depicted in the sequence of acts 400, the transportation sharing system 106 can provide the ephemeral-transportation option to the new requestor for a threshold amount of time.

As shown in FIG. 4, the sequence of acts 400 begins with an act 402 of detecting one or both of a pickup location and a drop-off location of a new requestor. For example, as mentioned above, the transportation sharing system 106 can detect the pickup location and the drop-off location of the new requestor based on one or more session events associated with an active requestor application on a new requestor's client device. To illustrate, the transportation sharing system 106 can receive data indicating session events associated with the active requestor application that include, but are not limited to, an indication of the requestor application opening or initiating on the requestor client device, an indication of a selection of a pickup location in the active requestor application, an indication of a selection of a drop-off location in the active requestor application, and an indication of a selection of one or more requestor preferences in the active requestor application. In at least one embodiment, the transportation sharing system 106 can detect a pickup location and a drop-off location directly from the pickup and drop-off locations selected within the active requestor application. Similarly, in at least one embodiment, the transportation sharing system 106 can detect a pickup location and a drop-off location from a transportation request received from the requestor client device.

Additionally or alternatively, the transportation sharing system 106 can detect the pickup and drop-off locations based on historical transportation data associated with the new requestor. For example, the transportation sharing system 106 can identify historical transportation data associated with the new requestor that includes, but is not limited to, (i) a number of previous transportation requests submitted by the new requestor, (ii) a number of previous transportation matches associated with the new requestor, (iii) a number of previous completed transportation matches, (iv) a number of previously provided ephemeral-transportation options, (v) a number of previously selected ephemeral-transportation options, (vi) average distance of transportation, (vii) previously utilized pickup locations, (viii) previously utilized drop-off locations, (ix) times and time ranges associated with previous transportation requests, (x) a number of shared transportations previously selected by the new requestor, and (xi) a number of non-shared transportation previously selected by the new requestor.

Based on this and other historical transportation data, the transportation sharing system 106 can detect a likely pickup location and/or drop-off location associated with the new requestor. For example, the transportation sharing system 106 can utilize the historical transportation data to identify a pattern of use associated with the new requestor. To illustrate, the transportation sharing system 106 can analyze previous pickup locations and drop-off locations to identify trips commonly taken by the new requestor. Based on a comparison between the pickup times and locations associated with the identified common trips of the new requestor and the current time and location associated with the new requestor, the transportation sharing system 106 can determine that the current location or a nearby location (e.g., within a threshold walking distance) is a likely pickup location of the new requestor.

The transportation sharing system 106 can further identify request times associated with common routes to determine whether there are trips that the new requestor takes with a threshold level of frequency. For instance, the transportation sharing system 106 can identify most-commonly taken trips based on a weekly frequency threshold (e.g., more than three days a week), or a monthly frequency threshold (e.g., more than ten days a month). Additionally or alternatively, the transportation sharing system 106 can identify most-commonly taken trips based on other events. For instance, the transportation sharing system 106 can identify most-commonly taken trips based on the weather (e.g., a trip frequently taken during bad weather), or based on other public events (e.g., a trip frequently taken when the local professional basketball team has a home game).

In some embodiments, the transportation sharing system 106 identifies these common trips and times utilizing a score-based approach. For example, the transportation sharing system 106 can assign a score for each identified trip and increase the score for each additional time the trip is taken during a period of time reflected by the historical transportation data. In some implementations, the transportation sharing system 106 weights the assigned score based on features of the trip (e.g., the average cost of the trip or the travel time associated with the trip).

Additionally or alternatively, the transportation sharing system 106 can identify common trips and times utilizing a machine-learning approach. For example, the transportation sharing system 106 can train a trip identifying model utilizing ground truth historical transportation data across a use history of previous requests and transportations associated with the new requestor. The trip identifying model can be, for example, a support vector machine, k-Nearest Neighbor, convolutional neural network, or other machine-learning model that is trained to classify one or more of the new requestor's trips as being a common trip. Regardless of the manner of identification, the transportation sharing system 106 can store the identified common trips and request times in association with the new requestor.

In at least one embodiment, the transportation sharing system 106 utilizes the identified common trips to identify a pickup location and/or drop-off location associated with the new requestor. For example, the transportation sharing system 106 can determine that the new requestor's current time and location correspond with one or more of the identified common trips. The transportation sharing system 106 can then detect the user's current location as a pickup location based on this determination. The transportation sharing system 106 can further detect the drop-off location or locations as those associated with the identified common trips.

To illustrate, the transportation sharing system 106 may identify a common trip associated with the new requestor that includes a pickup location at a residential address (e.g., where the new requestor lives), a drop-off location at a building downtown (e.g., where the new requestor works), and a request time around 8:30 in the morning on most weekdays. Based on this identified common trip, the transportation sharing system 106 can use the current time and day of the requestor client device in a geographic region associated with the common trip approaching 8:30 a.m. on a weekday to trigger detecting the pickup location and the drop-off location including the residential address and the building downtown, respectively.

In one or more embodiments, the transportation sharing system 106 can utilize a hybrid approach to detect a pickup and drop-off location associated with the new requestor. For example, the transportation sharing system 106 can detect a pickup location based on the new requestor selecting a pickup location within an active requestor application session on a requestor client device. The transportation sharing system 106 can then detect a drop-off location based on the historical transportation data analysis discussed above in light of the selected pickup location and the current time. For example, the transportation sharing system 106 can identify one or more common trips associated with the new requestor that include request times that correspond to the current time, as well as pickup locations that correspond to the selected pickup location. The transportation sharing system 106 can then detect the drop-off location from the identified one or more common trips.

Returning to FIG. 4, the sequence of acts 400 next includes an act 404 of detecting active transportation by a transportation vehicle of an existing requestor. As noted above, the transportation sharing system 106 detects active transportation of an existing requestor that correlates with the detected pickup and drop-off locations of the new requestor. As also mentioned above, the transportation sharing system 106 identifies one or more active transportations, where each active transportation comprises a route. The route of each active transportation begins with a current location of a matched provider, continues to a pickup location of a requestor, and ends with a drop-off location of the requestor. Accordingly, when the transportation sharing system 106 detects a pickup location and a drop-off location associated with a new requestor, the transportation sharing system 106 can begin identifying an active transportation of an existing requestor that is ongoing in the new requestor's general location based on such routes. For example, the transportation sharing system 106 can initially identify all active transportations that are ongoing in the new requestor's city, zip code, neighborhood, or geographic area. Additionally or alternatively, the transportation sharing system 106 can identify all active transportations that are ongoing within a threshold distance (e.g., one mile, 500 yards) of the detected pickup location or drop-off location of the new requestor.

After initially detecting active transportations within a given area or distance, in some embodiments, the transportation sharing system 106 narrows or filters the identified active transportations based on the detected pickup and drop-off locations of the new requestor. For example, for every identified active transportation that corresponds with the new requestor's general location, the transportation sharing system 106 can determine whether there is a threshold correlation between the pickup and drop-off locations of the new requestor and the route associated with the identified active transportation based on distance. In one or more embodiments, the transportation sharing system 106 can determine that there is a threshold correlation between the pickup and drop-off locations of the new requestor and the route associated with an identified active transportation based on the pickup and drop-off location of the new requestor being within a threshold distance of one or more points along the route of the active transportation.

In at least one embodiment, this threshold distance is variable depending on various considerations. For example, the transportation sharing system 106 can determine the threshold distance based on requestor activity by shortening the threshold distance in high activity areas, and lengthening the threshold distance in low activity areas. Additionally or alternatively, the transportation sharing system 106 can determine the threshold distance based on traffic activity by shortening the threshold distance in high traffic areas, and lengthening the threshold distance in low activity areas. Based on any of these considerations, the transportation sharing system 106 can detect one or more specific active transportations of an existing requestors that correlate with the pickup and drop-off location of the new requestor.

Returning to FIG. 4, after detecting one or more active transportations, the transportation sharing system 106 further performs an act 406 of determining that adding the new requestor to the active transportation will not exceed a threshold amount of travel time. While the pickup and drop-off locations of the new requestor may be within a threshold distance of one or more points on a route of an active transportation, it is possible that adding the new requestor's pickup and drop-off locations to that active transportation will cause unacceptable delay to the travel time of the active transportation of the existing requestor. For example, current traffic or road construction may cause even a small route detour to unacceptably increase an overall travel time. Accordingly, the transportation sharing system 106 attempts to balance the transportation interests of the existing requestor associated with the active transportation with the benefits to the new requestor associated with sharing the active transportation.

In one or more embodiments, the transportation sharing system 106 performs this balancing by determining that the initial travel time associated with an initial route of the active transportation is not adversely impacted by either (i) adding the pickup and/or drop-off locations of the new requestor to the initial route or (ii) adjusting the initial route to include the pickup and drop-off locations of the new requestor. For example, the transportation sharing system 106 can determine an initial travel time associated with the initial route of the active transportation of the existing requestor. The transportation sharing system 106 can also determine an adjusted travel time for an adjusted route that includes either (i) the initial route with the pickup and/or drop-off locations of the new requestor added (i.e., the pickup and/or drop-off locations of the new requestor are on the initial route), or (ii) an adjusted route that is different from the initial route but includes the pickup and/or drop-off locations of both the existing requestor and the new requestor.

Upon determining travel times for an initial route and adjusted route, the transportation sharing system 106 determines that adding the new requestor to a particular active transportation will not exceed the threshold amount of additional travel time. For example, the transportation sharing system 106 determines that the threshold amount of additional travel time will not be exceeded by determining a travel-time difference between the initial travel time and the adjusted travel time. For example, the transportation sharing system 106 can determine that adding the new requestor to the active transportation will not exceed the threshold amount of additional travel time by determining that the travel-time difference is less than or equal to the threshold amount of additional travel time.

The threshold amount of additional travel time may be a static amount of time. For example, sharing the active transportation with the new requestor cannot delay the active transportation of the existing requestor by more than five minutes. Additionally or alternatively, the transportation sharing system 106 can determine the threshold amount of additional travel time based on historical transportation data associated with the provider of the active transportation and/or the existing requestor associated with the active transportation. For example, the transportation sharing system 106 can adjust the threshold amount of additional travel time based on an analysis of historical transportation data that indicates the provider and/or the existing requestor are more or less tolerant of time delays in transportation. The transportation sharing system 106 can utilize a weighted score based on historical transportation signals, or a machine learning approach to make this determination.

Returning to FIG. 4, after determining a shared transportation satisfies such a threshold, the transportation sharing system 106 further performs an act 408 of matching the new requestor with the active transportation. For example, the transportation sharing system 106 can match the new requestor with the active transportation of the existing requestor in response to determining that the travel-time difference is within (e.g., less than or equal to) the threshold amount of additional travel time. As mentioned above, the transportation sharing system 106 can perform the match without receiving a transportation request from the new requestor, and without receiving a match-acceptance from the provider of the active transportation. But in addition to determining that the travel-time difference is less than the threshold amount of additional travel time, the transportation sharing system 106 can match the new requestor with the active transportation based on further determinations that there is (i) a threshold adjustment time remaining sufficient for the provider to safely divert the transportation vehicle to an adjusted route that includes the new requestor, and (ii) a threshold selection time remaining sufficient for the new requestor to consider and accept the match.

To illustrate, the transportation sharing system 106 can determine whether the provider has a threshold adjustment time remaining sufficient to safely divert to an adjusted route based on a minimum reaction time. For instance, the transportation sharing system 106 provides a threshold adjustment time of fifteen seconds in a notice to a provider device of a shared transportation and adjusted route so the corresponding provider can safely adjust to the adjusted route (e.g., avoiding traveling past a new turn for the adjusted route). To determine a threshold adjustment time, the transportation sharing system 106 can detect a speed associated with the transportation vehicle and a position of the transportation vehicle on the initial route. The transportation sharing system 106 can then utilize this information to determine an amount of deviation time or distance remaining until the transportation vehicle reaches a point of deviation (or a later point of deviation) where the adjusted route associated with the new requestor departs from the initial route associated with the existing requestor. The transportation sharing system 106 then compares this amount of deviation time to the minimum reaction time. If the determined deviation time is less than the minimum reaction time, the transportation sharing system 106 can determine that there is not a threshold adjustment time remaining sufficient for the provider associated with the transportation vehicle to be matched with the new requestor.

Moreover, the transportation sharing system 106 may determine that the new requestor needs a threshold selection time to consider and accept the match (e.g., to select an ephemeral-transportation option associated with the match). The transportation sharing system 106 can adjust the threshold selection time based on how the match is presented to the new requestor. For example, the transportation sharing system 106 may determine that the threshold selection time is fifteen seconds when the match is presented to the new requestor as an ephemeral-transportation option while the new requestor is actively using the requestor application to configure a transportation request. As a further example, the transportation sharing system 106 may determine that the threshold selection time is twenty-five seconds when the match is initially presented as a push notification that the new requestor has to select to enter the requestor application and further accept the match.

Accordingly, the transportation sharing system 106 can match the new requestor with the active transportation based on determining that there is an amount of selection time remaining that is equal to or greater than the threshold selection time, and that the deviation time is not less than the minimum reaction time such that the threshold adjustment time for the provider is satisfied. For example, the transportation sharing system 106 can add the determined threshold selection time associated with the new requestor to the deviation time associated with the provider of the transportation vehicle. If the sum of the threshold selection time and the deviation time is less than the minimum reaction time associated with the point at which the adjusted route deviates from the initial route, the transportation sharing system 106 can determine not to match the new requestor with the active transportation. If the sum of the threshold selection time and the deviation time is more than the minimum reaction time, the transportation sharing system 106 can match the new requestor with the active transportation.

In at least one embodiment, the transportation sharing system 106 can further match the new requestor with the active transportation based on a determined likelihood that the new requestor will accept the match. For example, the transportation sharing system 106 can determine a likelihood that the new requestor will accept the match based on an analysis of historical transportation data associated with the new requestor. The transportation sharing system 106 can calculate a weighted likelihood score for the new requestor based on one or more of (i) a number of times the new requestor has previously accepted a match associated with an ephemeral-transportation option, (ii) a number of times the new requestor has previously accepted shared transportation, (iii) a number of previous trips taken by the new requestor, (iv) a frequency of transportation associated with the new requestor, or (v) an average distance of transportation associated with the new requestor. If the new requestor's weighted score is more than a predetermined threshold score, the transportation sharing system 106 can determine that it is likely that the new requestor will accept a match associated with an ephemeral-transportation option. If the new requestor's weighted score is less than the predetermined threshold score, the transportation sharing system 106 may not match the new requestor with the active transportation. Additionally or alternatively, the transportation sharing system 106 may determine the likelihood score associated with the new requestor utilizing a trained machine learning model.

As further shown in FIG. 4, after matching the new requestor with an active transportation, the transportation sharing system 106 further performs an act 410 of providing an ephemeral-transportation option for the new requestor to share the active transportation with the existing requestor. For example, as will be discussed below with regard to FIGS. 5A-6B, the transportation sharing system 106 can provide an ephemeral-transportation option in a graphical user interface that includes any of a graphical representation of a route for the transportation vehicle to transport the new requestor and the existing requestor, information for the provider associated with the transportation vehicle (e.g., a provider indicator, transportation vehicle information), an estimated time of arrival of the transportation vehicle at the drop-off location of the new requestor, and a price for transporting the new requestor from the new requestor's pickup location to the drop-off location.

As noted above, the transportation sharing system 106 provides the ephemeral-transportation option for a threshold amount of time. In one or more embodiments, the transportation sharing system 106 determines the threshold amount of time based on several factors. For example, the transportation sharing system 106 can determine the threshold amount of time based on the deviation time and the selection time discussed above. To illustrate, the transportation sharing system 106 can determine a threshold amount of time during which the ephemeral-transportation option is valid by identifying an amount of time that is greater than or equal to a sum of the deviation time and the selection time. In one or more embodiments, such a threshold amount of time is long enough for the new requestor to consider and select the ephemeral-transportation option and then for the provider to safely divert the transportation vehicle from the initial route to the pickup location of the new requestor. In at least one embodiment, the transportation sharing system 106 provides the ephemeral transportation option for at least enough time for the provider to safely divert the transportation vehicle (e.g., fifteen seconds).

In at least one embodiment, the transportation sharing system 106 configures the ephemeral-transportation option to include a countdown feature associated with the threshold amount of time. For example, as will be illustrated with reference to FIGS. 5C-5G, the transportation sharing system 106 can configure the ephemeral-transportation option with a selectable element (e.g., a button) that gradually fills in with a color, pattern, or other visual graphic at a rate that corresponds to a countdown of the threshold amount of time until the ephemeral-transportation option becomes invalid. This countdown feature can inform the new requestor of an approximate amount of time that he or she has to accept the ephemeral-transportation option before the option expires.

Thus, returning to FIG. 4, after providing the ephemeral-transportation option to the new requestor, the transportation sharing system 106 further performs an act 412 of determining whether the threshold amount of time associated with the ephemeral-transportation option has elapsed. In response to determining that the threshold amount of time has elapsed, the transportation sharing system 106 can disable the ephemeral-transportation option. For example, the transportation sharing system 106 can disable the ephemeral-transportation option by greying the option out in the display of the requestor client device, by deactivating a select-shared option associated with the option in the display of the requestor client device, or by removing the option from the display of the requestor client device.

In response to determining that the threshold amount of time has elapsed (e.g., "Yes" in the act 412), the transportation sharing system 106 further performs an act 414 of canceling the match. For example, as mentioned above, the transportation sharing system 106 can generate the match without receiving a transportation request from the new requestor, and without having the match accepted by the provider of the transportation vehicle. Accordingly, the transportation sharing system 106 can cancel the match by removing the match from a central dispatch associated with the dynamic transportation matching system 104. In response to canceling the match, the transportation sharing system 106 can further disable the ephemeral-transportation option on the new requestor's device. In response to determining that the threshold amount of time has not elapsed (e.g., "No" in the act 412), the transportation sharing system 106 continues to perform the act 410 of providing the ephemeral-transportation option on the new requestor's requestor client device.

At any point while the ephemeral-transportation option is active on the new requestor's requestor client device, the transportation sharing system 106 can perform an act 416 of detecting a selection of the ephemeral-transportation option. For example, the transportation sharing system 106 can detect: a selection of the ephemeral-transportation option (i.e., the option is selectable), a selection of a button or other element associated with the ephemeral-transportation option, a voice command associated with the ephemeral-transportation option, and/or a type of haptic input associated with the ephemeral-transportation option (e.g., a device shake or tilt). If no selection of the ephemeral-transportation option is detected (e.g., "No" in the act 416), the transportation sharing system 106 performs the act 412 of determining whether the threshold amount of time has elapsed, as described above.

If a selection of the ephemeral-transportation option is detected (e.g., "Yes" in the act 416), the transportation sharing system 106 performs an act 418 of diverting the transportation vehicle to the pickup location of the new requestor. For example, the transportation sharing system 106 can divert the transportation vehicle by providing updated route guidance to the provider client device of the provider associated with the transportation vehicle. In some embodiments, the updated route guidance includes instructions for the transportation vehicle to travel along an initial route associated with the existing requestor to include as new waypoints both the pickup and drop-off locations associated with the new requestor. In certain implementations, the updated route guidance includes instructions for the transportation vehicle to travel along an adjusted route diverging from an initial route associated with the existing requestor to include the pickup and drop-off locations associated with the new requestor. As discussed above, the transportation sharing system 106 can provide the updated guidance to the provider client device for a threshold adjustment time suitable for the provider to safely drive the transportation vehicle along the adjusted route from the point where the adjusted route diverts from the initial route.

As further shown in FIG. 4, after diverting transportation, the transportation sharing system 106 performs an act 420 of detecting drop-offs. For example, the transportation sharing system 106 can detect the new requestor being picked up by the provider, the new requestor and the existing requestor being transported by the transportation vehicle for at least a portion of the adjusted route, and the drop-off of the new requestor followed by the drop-off of the existing request (or vice versa). Once both requestors are no longer traveling in the transportation vehicle, the transportation sharing system 106 can determine that the transportation is completed and release the provider to be matched with a new transportation request.

As mentioned above, the transportation sharing system 106 generates and provides ephemeral-transportation options to requestor client devices in response to matching new requestors with active transportation of existing requestors. In accordance with one or more embodiments, FIGS. 5A-5G illustrate the new requestor client device 116n presenting graphical user interfaces 504a-504c in connection with one or more ephemeral-transportation options, while FIGS. 6A and 6B illustrate the new requestor client device 116n presenting a push notification 604 in connection with an ephemeral-transportation option. As explained below, the transportation sharing system 106 provides one or more ephemeral-transportation options to the new requestor client device 116n in response to matching a new requestor with one or more active transportations of existing requestors based on a detected pickup location and drop-off location for the new requestor.

FIGS. 5A-6B likewise each depict the new requestor client device 116n presenting options and performing other functions of a requestor application for the dynamic transportation matching system 104. In some embodiments, the requestor application comprises computer-executable instructions that cause the new requestor client device 116n to perform certain actions depicted in FIGS. 5A-6B, such as presenting a graphical user interface of the requestor application. Rather than refer to the dynamic transportation matching system 104 or the transportation sharing system 106 as performing the actions depicted in FIGS. 5A-6B below, this disclosure will generally refer to the new requestor client device 116n as performing such actions for simplicity.

Figure 5B:
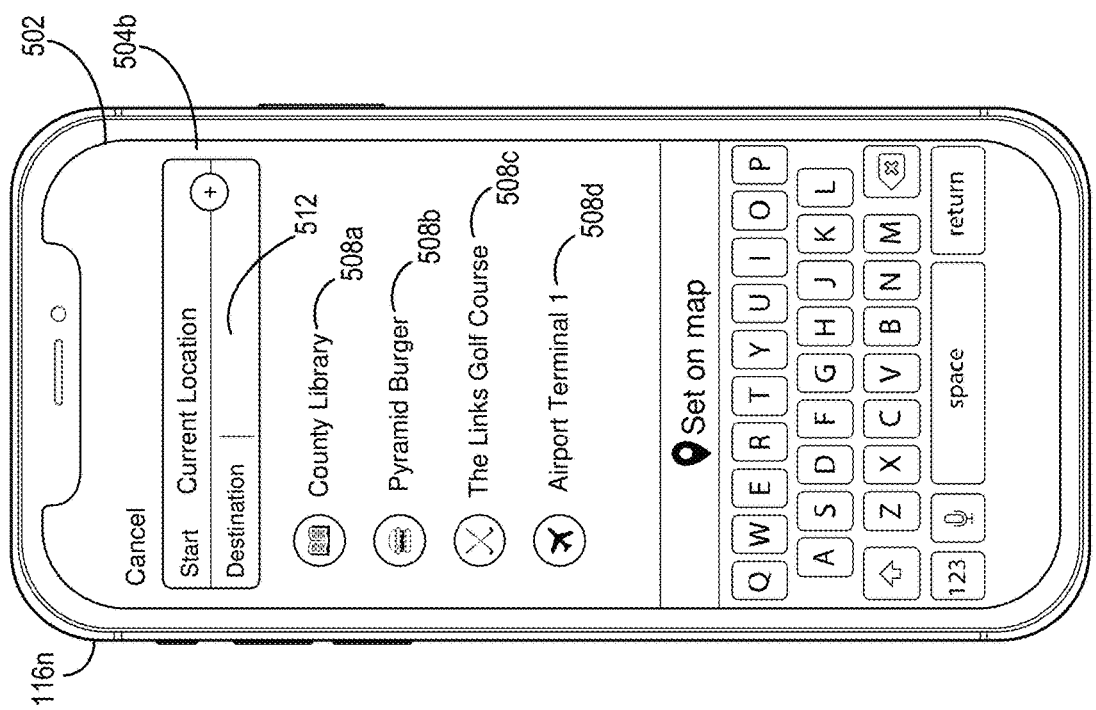
Figure 5A:
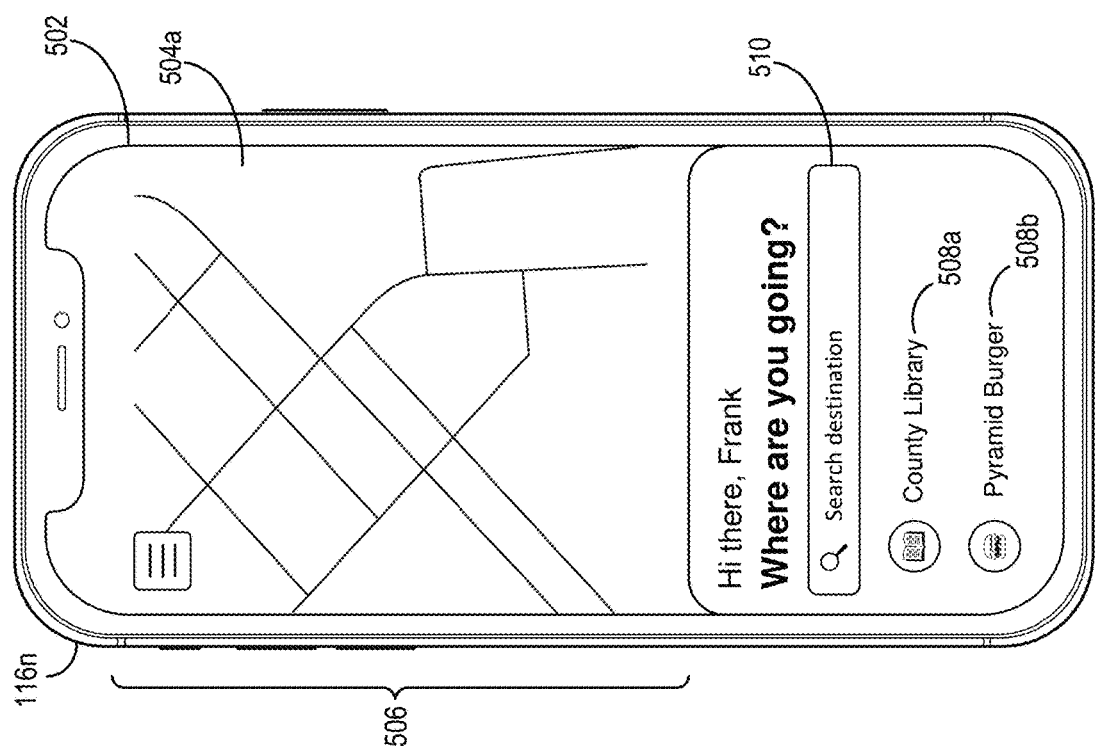
Figure 5D:
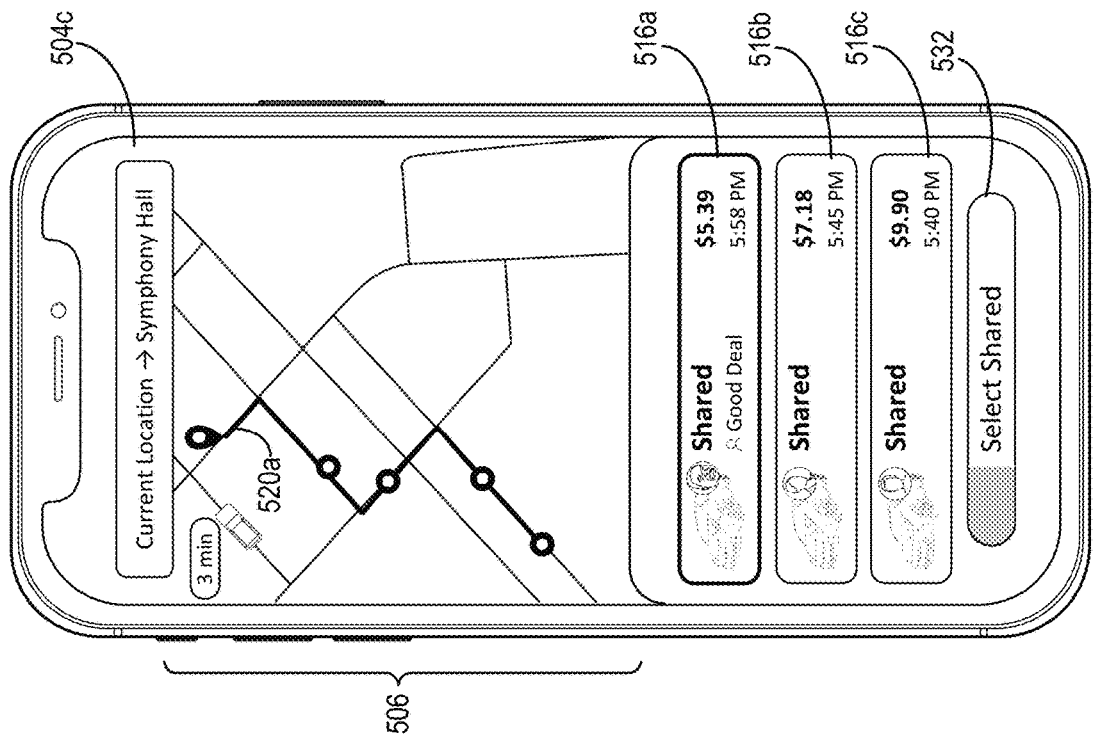

As shown in FIGS. 5A-5G, the transportation sharing system 106 can generate and provide an ephemeral-transportation option based on detecting one or more session events associated with an active session of the requestor application on the new requestor client device 116n. For example, as shown in FIG. 5A, upon activation or instantiation, the requestor application can provide a drop-off-location-configuration interface 504a on a display 502 (e.g., a touch-screen display) of the new requestor client device 116n. The drop-off-location-configuration interface 504a can include an interactive map 506 and a list of common-drop-off locations 508a and 508b associated with the new requestor.

In response to detecting a selection by a new requestor of the search-destination bar 510, the new requestor client device 116n can generate and provide the destination-configuration interface 504b, as shown in FIG. 5B. By detecting a selection of any of the common-drop-off locations 508a, 508b, 508c, or 508d, the new requestor client device 116n can assign the corresponding location as the drop-off location of a new transportation request associated with the new requestor. Similarly, the new requestor client device 116n can detect or receive a new drop-off location in response to an address entered into the destination-text box 512.

In one or more embodiments, the transportation sharing system 106 can detect one or more session events associated with any of the drop-off-location-configuration interface 504a or the destination-configuration interface 504b. For example, session events in association with the graphical user interfaces 504a or 504b can include, but are not limited to, initiating or opening the requestor application, interacting with any display element (e.g., the interactive map 506, the common-drop-off locations 508a-508d, the search-destination bar 510, the destination-text box 512), and switching application focus from the requestor application to a different application on the new requestor client device 116n.

Based on information associated with any of these session events, the transportation sharing system 106 can detect a pickup location and/or a drop-off location. For example, in response to detecting a selection by a new requestor of one of the common-drop-off locations 508a-508d, the transportation sharing system 106 can detect the corresponding drop-off location. Similarly, in response to an address input into the destination-text box 512, the transportation sharing system 106 can detect the address as the drop-off location.

In at least one embodiment, the transportation sharing system 106 can further detect at least a pickup location for the new requestor based on characteristics of the new requestor client device 116n. For example, the transportation sharing system 106 can detect the pickup location based on GPS data associated with the new requestor client device 116n, such as by identifying GPS coordinates or an address closest to the GPS coordinates as the pickup location. Additionally or alternatively, the transportation sharing system 106 can detect the pickup location based on: Wi-Fi data associated with the new requestor client device 116n, Bluetooth data associated with the new requestor client device 116n, or NFC (Near Field Communication) data associated with the new requestor client device 116n. For instance, in some cases, the transportation sharing system 106 identifies as the pickup location a nearby Wi-Fi hotspot or access point currently accessed by the new requestor client device 116n.

Based on detecting a pickup location and a drop-off location associated with the new requestor based on any of the considerations discussed above, the transportation sharing system 106 can generate and provide one or more ephemeral-transportation options. In an embodiment illustrated in FIG. 5C, for instance, the transportation sharing system 106 generates and provides data for a transportation-options interface 504c including an ephemeral-transportation option 516a in combination with other transportation options 518a and 518b in a transportation option list 514. For example, if the transportation sharing system 106 detects a pickup and drop-off location based on a transportation request submitted by the new requestor via the requestor application on the new requestor client device 116n, the transportation sharing system 106 can provide the ephemeral-transportation option 516a in the same display that includes the transportation options 518a and 518b generated by the dynamic transportation matching system 104.

Figure 5C:
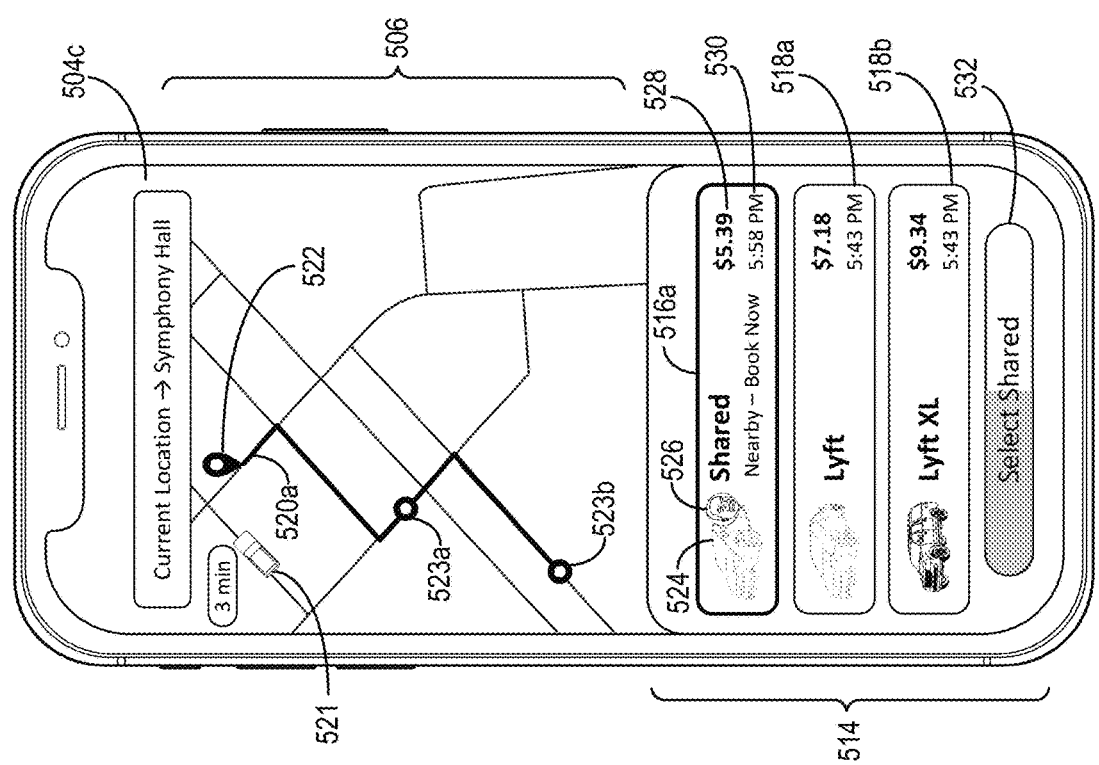
Figure 6B:
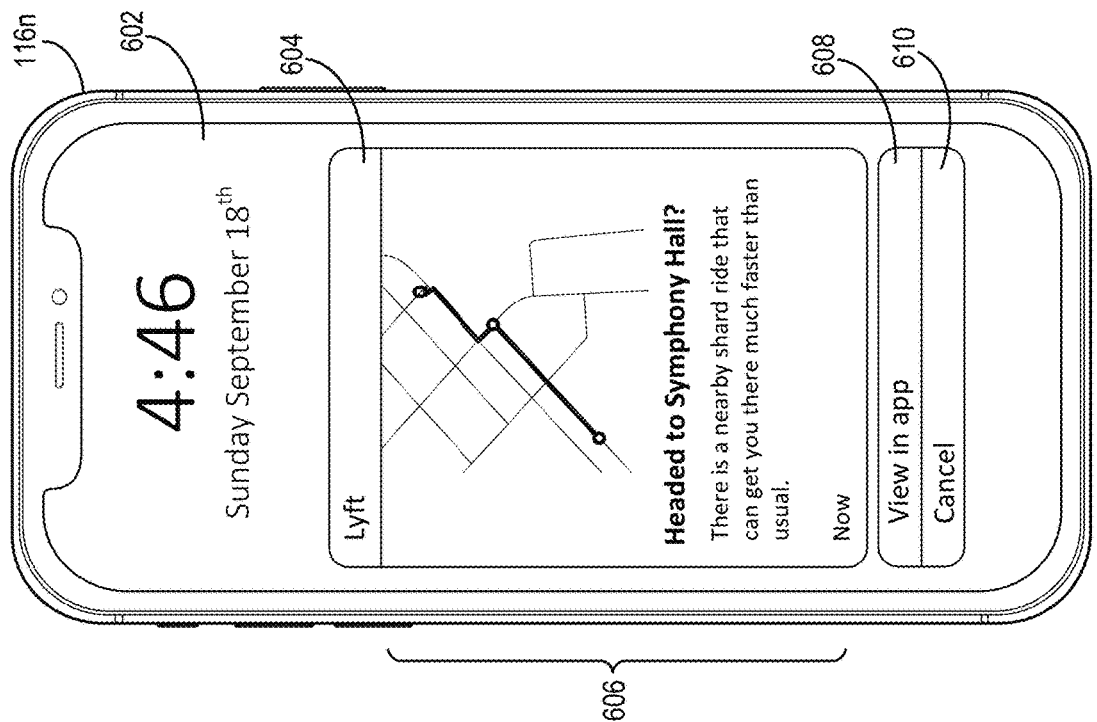
FIGS. 6A-6B illustrate example push notifications provided or generated by the transportation sharing system in accordance with one or more embodiments.
Figure 6A:
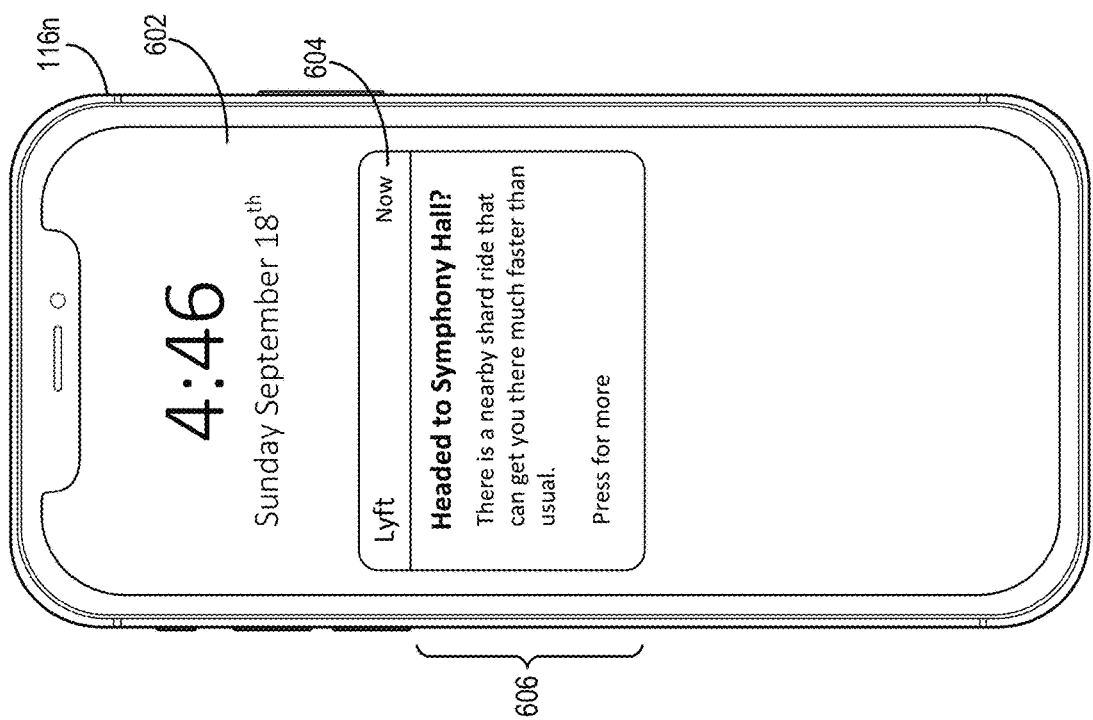

As further shown in FIG. 5C, the transportation sharing system 106 generates the transportation-options interface 504c to include information specific to the ephemeral-transportation option 516a and the active transportation corresponding to the ephemeral-transportation option 516a. For example, the transportation sharing system 106 generates and provides the ephemeral-transportation option 516a to include a vehicle indicator 524 corresponding to the transportation vehicle associated with the active transportation, a provider indicator 526 for a human provider of the transportation vehicle, a price indicator 528 indicating the cost of sharing the active transportation, and an ETA indicator 530 showing the estimated time of arrival for the new requestor at the detected drop-off location.

As further shown in FIG. 5C, in response to detecting a selection by a new requestor of the ephemeral-transportation option 516a, the transportation sharing system 106 can update the interactive map 506 in the transportation-options interface 504c to include information associated with the corresponding active transportation of the existing requestor. For example, the transportation sharing system 106 updates the interactive map 506 to include an adjusted route 520a with a pickup location 522 of the new requestor and one or more waypoints 523a and 523b. The waypoints 523a and 523b can be drop-off locations (e.g., the waypoint 523a may be the drop-off location of the new requestor or the existing requestor), or pickup locations of additional new requestors. The transportation sharing system 106 can further update the interactive map 506 to include a transportation vehicle animation 521 that shows both the transportation vehicle's progress toward the pickup location of the new requestor (e.g., as shown by the pickup location 522), and a remaining time indicator showing an amount of time remaining until the transportation vehicle arrives at the pickup location of the new requestor.

Further, in response to detecting a selection by a new requestor of the ephemeral-transportation option 516a, in some embodiments, the transportation sharing system 106 can update the transportation-options interface 504c to include a countdown feature. For example, as shown, the transportation sharing system 106 can provide and configure a select-shared option 532 to indicate a constantly updating amount of remaining time before the ephemeral-transportation option 516a expires. For instance, as shown in FIG. 5C and in at least one embodiment, the transportation sharing system 106 can configure the select-shared option 532 to gradually fill in with a color, pattern, or other visual graphic at a rate that corresponds with the predetermined amount of time during which the ephemeral-transportation option 516a is active or available. For example, due to the time, distance, and speed constraints in connection with the transportation vehicle, the provider driving the transportation vehicle, and the new requestor discussed above, the transportation sharing system 106 can determine that the ephemeral-transportation option 516a is only active or available for a predetermined amount of time after it has been provided via the new requestor client device 116n. The transportation sharing system 106 can the configure the select-shared option 532 to fill in at a rate that matches (or is proportionate to) how quickly the predetermine amount of time is elapsing.

To illustrate, if the predetermined amount of time is fifteen seconds after providing the ephemeral-transportation option 516a, the transportation sharing system 106 can configure the select-shared option 532 to fill in at a rate of $\frac{1}{15}^{th}$ the area of the select-shared option 532 per second. Thus, the select-shared option 532 informs the new requestor of a remaining amount of time that he or she has before the ephemeral-transportation option 516a becomes inactive or unavailable and will no longer be selectable.

In one or more embodiments, the transportation sharing system 106 can match the new requestor with multiple active transportations by different transportation vehicles of different existing requestors. As shown in FIG. 5D, for example, the transportation sharing system 106 can generate and provide ephemeral-transportation options 516a, 516b, 516c associated with each match. In response to detecting a selection by a new requestor of one of the ephemeral-transportation options 516a-516c, the transportation sharing system 106 can update the interactive map 506 and the select-shared option 532 in the transportation-options interface 504c to reflect the information associated with the selected ephemeral-transportation option.

For example, as shown in FIG. 5D, in response to detecting a selection by a new requestor of the ephemeral-transportation option 516a, the transportation sharing system 106 can update the interactive map 506 to include the adjusted route 520a and the current position and direction of the associated transportation vehicle. Similarly, the transportation sharing system 106 can update the select-shared option 532 to accurately reflect a remaining amount of time during which the ephemeral-transportation option 516a is valid.

As shown in FIGS. 5E and 5F, the transportation sharing system 106 can similarly update the interactive map 506 and the select-shared option 532 in response to detected selections of the ephemeral-transportation options 516b and 516c, respectively. For example, as shown in FIG. 5E, in response to detecting a selection by a new requestor of the ephemeral-transportation option 516b, the transportation sharing system 106 can update the interactive map 506 to include an adjusted route 520b and can update the select-shared option 532 to reflect a different and corresponding (e.g., shorter) amount of remaining time. Additionally, as shown in FIG. 5F, in response to detecting a selection by a new requestor of the ephemeral-transportation option 516c, the transportation sharing system 106 can update the interactive map 506 to include an adjusted route 520c and can update the select-shared option 532 to reflect a different and corresponding (e.g., an even shorter) amount of remaining time.

Figure 5G:
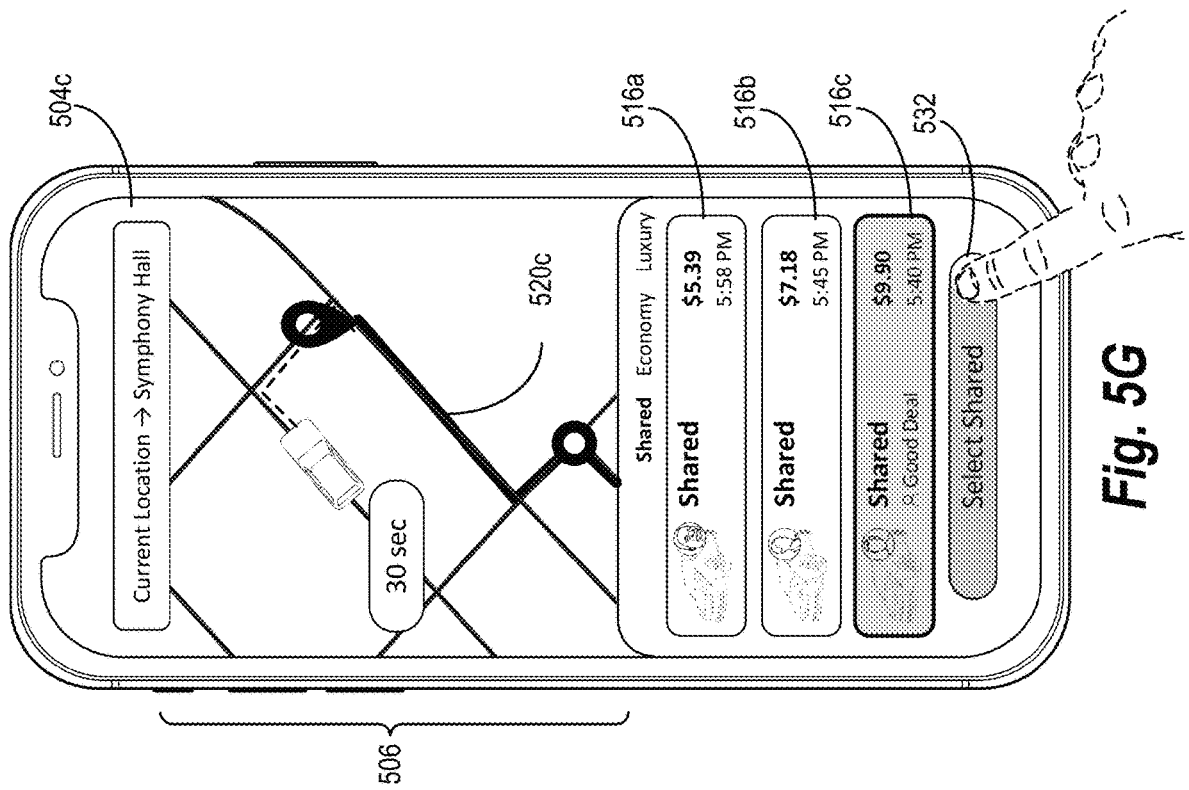

FIG. 5G illustrates the transportation sharing system 106 updating the graphical user interface 504c in response to a detected selection of the select-shared option 532 in connection with the ephemeral transportation option 516c. For example, as discussed above, in response to the detected selection of the ephemeral transportation option 516c, the transportation sharing system 106 can update the select-shared option 532 to reflect a remaining amount of time during which the ephemeral transportation option 516c is valid.

In response to detecting a selection of the select-shared option 532, the transportation sharing system 106 (i) diverts the provider associated with the ephemeral transportation option 516c to the pickup location of the new requestor client device 116n and (ii) causes the new requestor client device 116n to update the interactive map 506 to show the progress of the provider toward the pickup location of the new requestor client device 116n. For instance, as shown in FIG. 5G, the transportation sharing system 106 can indicate a remaining amount of time until the provider arrives at the pickup location (e.g., "30 sec") and a route that the provider will take to arrive at the pickup location (e.g., with a dashed line or similar). In at least one embodiment, the transportation sharing system 106 updates the interactive map 506 immediately (or in near-real time) upon detecting the user selection of the select-shared option 532 in connection with one of the ephemeral transportation options 516a-516c.

In addition or in the alternative to providing one or more ephemeral-transportation options as shown in FIGS. 5C-5G, the transportation sharing system 106 can provide a "flash sale" option for shared transportation. For example, the transportation sharing system 106 can provide a notification, overlay, pop-up, or similar visual indicator on the new requestor client device 116n that provides a shared transportation option to the new requestor 120n for a lower cost. Such a lower cost may represent, for instance, the specific cost of a shared transportation by a specific provider rather than a historical average-cost estimate provided by conventional systems. In response to a detected selection of this option, the transportation sharing system 106 can divert a transportation vehicle 108 associated with the shared transportation to the pickup location associated with the new requestor 120*n*.

In addition or in the alternative to providing ephemeral-transportation options in an active requestor application, as shown in FIGS. 5C-5G, the transportation sharing system 106 can also provide ephemeral-transportation options in other contexts. As shown in FIGS. 6A and 6B, based on matching a new requestor with an active transportation based on historical transportation data as discussed above, the transportation sharing system 106 can provide the push notification 604 corresponding to an ephemeral-transportation option. For example, the transportation sharing system 106 may perform an analysis of historical transportation data associated with the new requestor of the new requestor client device 116*n* to determine that it is likely (e.g., above a probability threshold) that the new requestor will submit a transportation request associated with "SF Symphony Hall" soon (e.g., within a threshold amount of time from the current time). In response to this determination, the transportation sharing system 106 can match the new requestor with an active transportation of an existing requestor that corresponds with the pickup and drop-off locations of the new requestor.

As discussed above, the transportation sharing system 106 can perform this analysis and matching even if the requestor application is not currently open and/or active on the new requestor client device 116*n*. In one or more embodiments, to notify the new requestor of the match and corresponding ephemeral-transportation option, the transportation sharing system 106 can provide the push notification 604 to the new requestor client device 116*n* for a threshold amount of time. As shown in FIG. 6A, the transportation sharing system 106 can configure the push notification 604 to include ephemeral-transportation-option information 606 associated with the match. For instance, the ephemeral-transportation-option information 606 can include the likely drop-off location (e.g., "SF Symphony Hall"), and other information for the shared ride. The transportation sharing system 106 can provide the push notification 604 overlaid on the lock screen 602 of the new requestor client device 116*n* (as depicted in FIG. 6A), or can provide the push notification 604 overlaid on a display of any other application installed on the new requestor client device 116*n*. In additional or alternative embodiments, the transportation sharing system 106 can provide this same type of pushed information by way of a banner, a badge, an icon, a sticker, or so forth.

In at least one embodiment, in response to an initial selection of the push notification 604, the transportation sharing system 106 can update the push notification 604 to include updated ephemeral-transportation-option information 606. For example, as shown in FIG. 6B, the transportation sharing system 106 can update the ephemeral-transportation-option information 606 provided within the push notification 604 to include a graphical representation of the adjusted route of the active transportation associated with the match—including graphical representations of the pickup and drop-off locations of the new requestor. In response to detecting a selection by a new requestor of a view option 608, the transportation sharing system 106 can activate the requestor application on the new requestor client device 116*n* to a display of an ephemeral-transportation option associated with the match (e.g., as in FIG. 5D). In response to detecting a selection by a new requestor of a cancel button 610, the transportation sharing system can cancel the match and remove the push notification 604 from the new requestor client device 116*n*.

As mentioned above, the transportation sharing system 106 can provide the push notification 604 for a threshold amount of time. In one or more embodiments, this threshold amount of time is related to the amount of time that the ephemeral-transportation option is active or available, as discussed above. For example, the transportation sharing system 106 can determine the threshold amount of time to provide the push notification 604 by adding a predetermined amount of time (e.g., ten seconds) to the amount of time during which the corresponding ephemeral-transportation option is active or available. To illustrate, the transportation sharing system 106 may determine 1) that the transportation vehicle is 60 seconds away from passing a point beyond which it cannot pick up the new requestor; 2) that the transportation vehicle has a minimum reaction time of 15 seconds; and 3) that the new requestor needs at least 20 seconds to be able to view and consider the ephemeral-transportation option associated with the match. Based on these determinations, the transportation sharing system 106 can determine to provide the push notification 604 for 25 seconds (e.g., 60 seconds minus 15 seconds minus 20 seconds). Accordingly, in certain implementations, the threshold amount of time for which the transportation sharing system 106 provides the push notification 604 is variable, depending on considerations associated with the speed and direction of the transportation vehicle and the new requestor.

Figure 7:
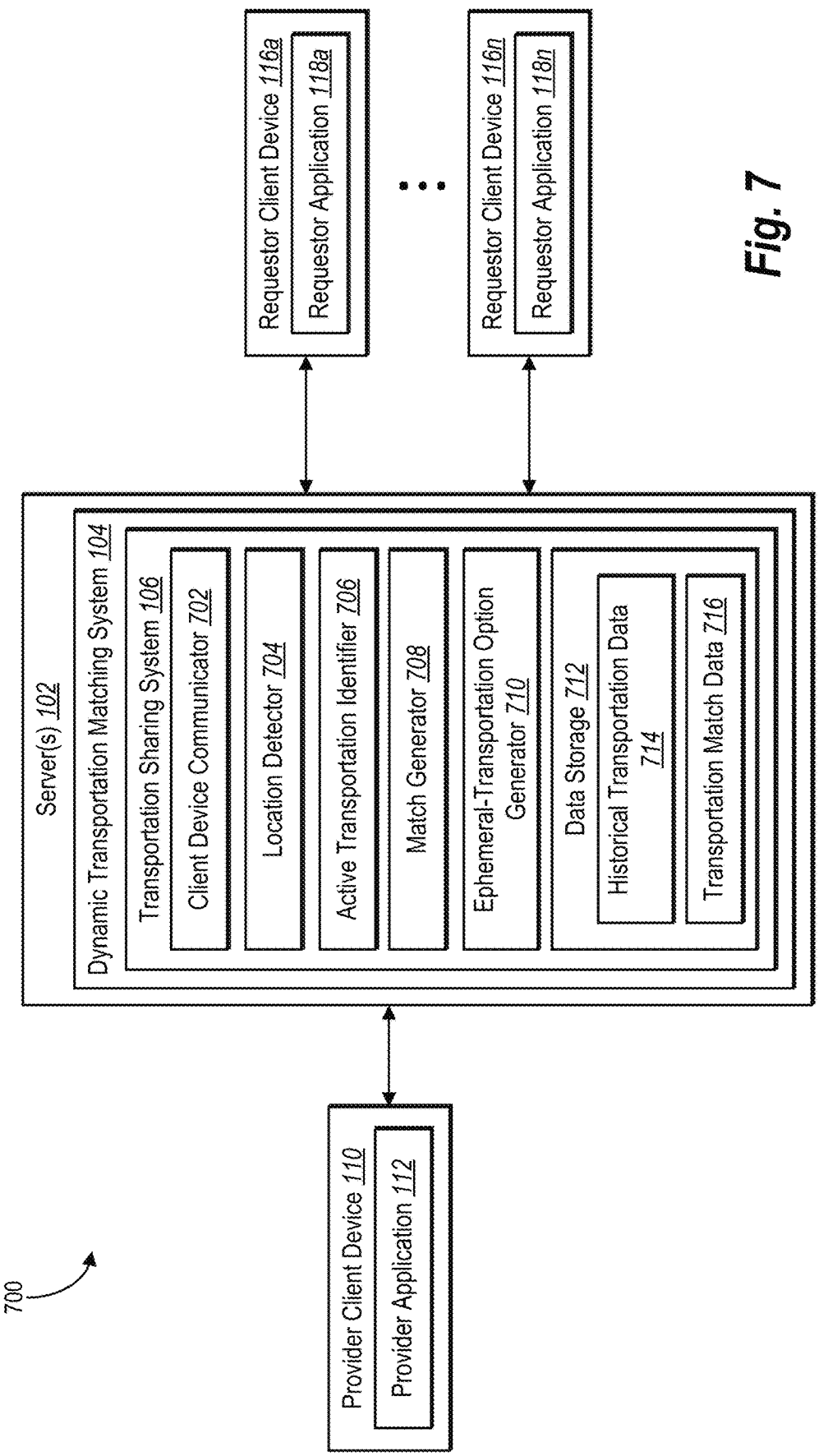
FIG. 7 illustrates a schematic diagram of the transportation sharing system in accordance with one or more embodiments.

Turning now to FIG. 7, additional detail is provided regarding a computing system 700, including components and capabilities of the transportation sharing system 106 in accordance with one or more embodiments. As shown, the transportation sharing system 106 is implemented by the server(s) 102, including the dynamic transportation matching system 104. In some embodiments, the components of the transportation sharing system 106 can be implemented by a single device (e.g., the server(s) 102, the existing requestor client device 116*a*, the new requestor client device 116*n*, the provider client device 110) or multiple devices. As shown, the transportation sharing system 106 includes a client device communicator 702, a location detector 704, an active transportation identifier 706, a match generator 708, an ephemeral-transportation option generator 710, and a data storage 712 including historical transportation data 714 and transportation match data 716. Each is discussed in turn below.

As just mentioned, and as shown in FIG. 7, the transportation sharing system 106 includes the client device communicator 702. In one or more embodiments, the client device communicator 702 handles all communications between the transportation sharing system 106, the requestor client devices 116*a* and 116*n*, and the provider client device 110. For example, the client device communicator 702 receives signals from the provider client device 110 and the requestor client devices 116*a* and 116*n*. The client device communicator 702 further provide updated route guidance to the provider client device 110 and ephemeral-transportation options to at least the new requestor client device 116*n*. Additionally, the client device communicator 702 can also handle communications between the transportation sharing system 106 and the dynamic transportation matching system 104. For example, the client device communicator 702 can communicate real-time matches to the dynamic transportation matching system 104.

As mentioned above, and as shown in FIG. 7, the transportation sharing system 106 also includes the location detector 704. In one or more embodiments, the location detector 704 identifies pickup and drop-off locations associated with a new requestor. For example, and as discussed above, the location detector 704 can analyze active session events associated with the new requestor and/or historical transportation data associated with the new requestor. Based on this analysis, the location detector 704 can determine that the new requestor will likely submit a transportation request associated with the detected pickup and drop-off locations. The location detector 704 can also continually determine a location associated with a transportation vehicle (e.g., based on GPS data from a provider client device inside the transportation vehicle), for the purposes of real-time matching with the new requestor.

As further mentioned above, and shown in FIG. 7, the transportation sharing system 106 includes the active transportation identifier 706. In one or more embodiments, the active transportation identifier 706 maintains and updates a collection, pool, or list, of active transportations in one or more regions. For example, the active transportation identifier 706 can identify pickup and drop-off locations associated with ongoing, active transportations in a region and generate routes for each active transportation. The active transportation identifier 706 can further determine whether the pickup and drop-off locations of a new requestor correspond with any of the active transportations by determining whether the pickup and drop-off locations of the new requestor are within a threshold distance of the generated routes. From this, the active transportation identifier 706 can identify one or more active transportations that have a threshold correspondence with the new requestor.

As mentioned above, and as shown in FIG. 7, the transportation sharing system 106 further includes the match generator 708. In one or more embodiments, the match generator 708 can generate a match between the new requestor and an active transportation of an existing requestor by determining whether adding the new requestor to the active transportation will cause undue delay to the travel time of the existing requestor. For example, the match generator 708 can determine whether adding the pickup and drop-off locations to either the initial route or an adjusted route of the active transportation will exceed a threshold amount of additional travel time beyond an initial travel time for the existing requestor. If adding the new requestor does not cause undue delay, the match generator 708 can generate a match between the new requestor and the active transportation without receiving a transportation request from the new requestor, and without receiving a match acceptance from the provider associated with the active transportation.

As further mentioned above, and as shown in FIG. 7, the transportation sharing system 106 includes the ephemeral-transportation option generator 710. In one or more embodiments, the ephemeral-transportation option generator 710 configures and provides ephemeral-transportation options associated with matches. For example, in response to a match between the new requestor and an active transportation of an existing requestor, the ephemeral-transportation option generator 710 can configure and provide an ephemeral-transportation option to the requestor client device (e.g., the new requestor client device 116*n*) that includes one or more of information about the transportation vehicle, the provider, the estimated time of arrival, the price, the adjusted route, and a countdown mechanism associated with the option (e.g., the gradually filled-in select-shared option 532 shown in FIG. 5C).

The ephemeral-transportation option generator 710 can also determine the threshold amount of time during which the ephemeral-transportation option is valid. For example, the ephemeral-transportation option generator 710 can determine the deviation time for the transportation vehicle, and the selection time for the new requestor. The ephemeral-transportation option generator 710 can further determine a threshold amount of time associated with the ephemeral-transportation option based on the deviation time and the selection time in light of the system-wide minimum reaction time. In response to determining that the threshold amount of time during which the ephemeral-transportation option is valid has elapsed, the ephemeral-transportation option generator 710 can remove the ephemeral-transportation option and cancel the associated match.

The transportation sharing system 106 also includes the data storage 712. In one or more embodiments, the data storage 712 includes the historical transportation data 714. For example, the historical transportation data 714 can include historical transportation information and requestor use patterns, such as described herein. Additionally, in one or more embodiments, the data storage 712 includes the transportation match data 716. For example, the transportation match data 716 can include match information including corresponding ephemeral-transportation options and threshold amounts of time during which such ephemeral-transportation options are valid, such as described herein.

Each of the components of the computing system 700 can include software, hardware, or both. For example, the components of the computing system 700 can include one or more instructions stored on a computer-readable storage medium and executable by processors of one or more computing devices, such as a client device or a server device. When executed by the one or more processors, the computer-executable instructions of the transportation change system 105 can cause the computing device(s) (e.g., the server(s) 102) to perform the methods described herein. Alternatively, the components of the computing system 700 can include hardware, such as a special-purpose processing device to perform a certain function or group of functions. Alternatively, the components of the computing system 700 can include a combination of computer-executable instructions and hardware.

Furthermore, the components of the computing system 700 may, for example, be implemented as one or more operating systems, as one or more stand-alone applications, as one or more modules of an application, as one or more plug-ins, as one or more library functions or functions that may be called by other applications, and/or as a cloud-computing model. Thus, the components of the computing system 700 may be implemented as a stand-alone application, such as a desktop or mobile application. Furthermore, the components of the computing system 700 may be implemented as one or more web-based applications hosted on a remote server.

Figure 8:
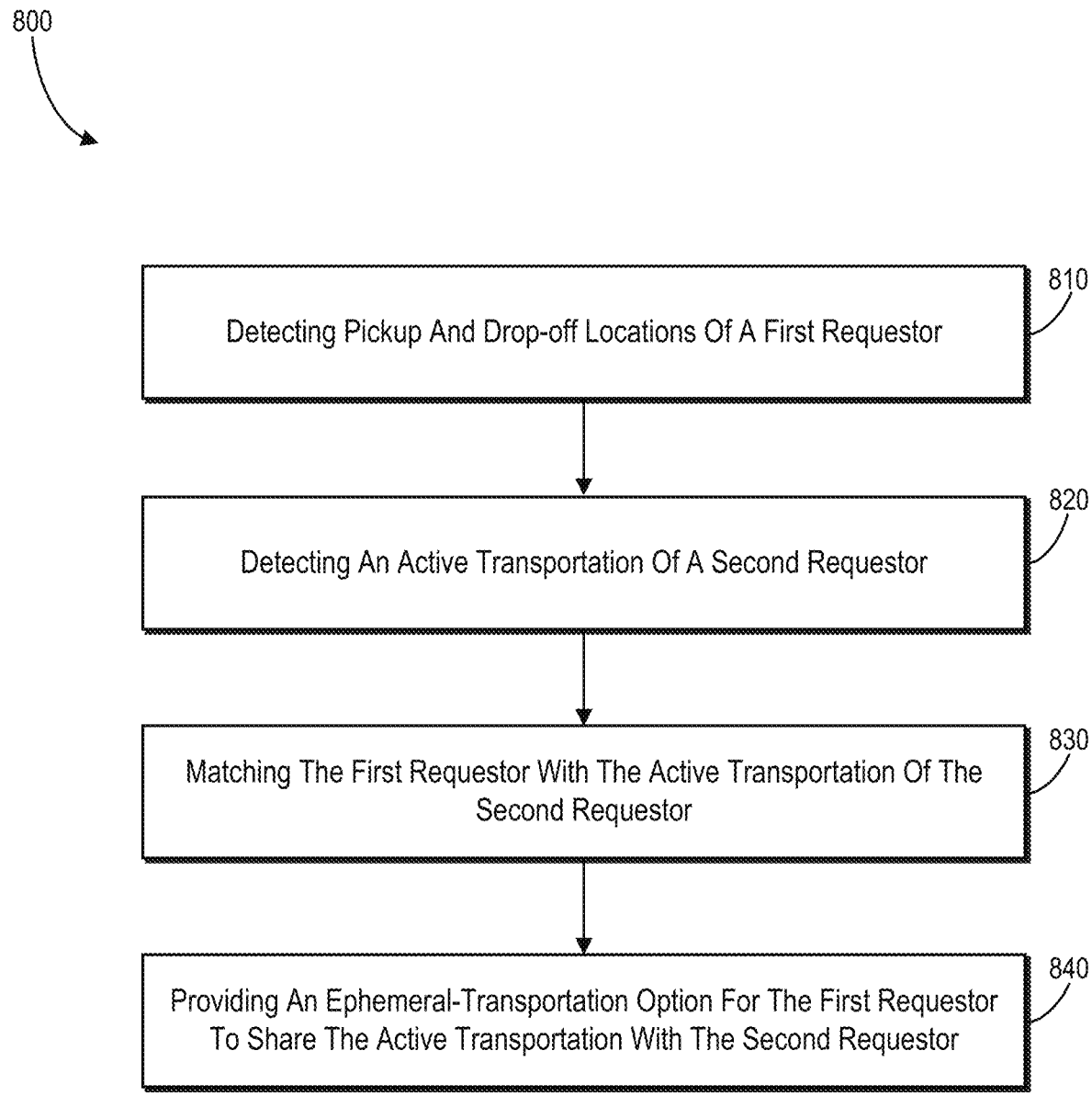
FIG. 8 illustrates a flowchart of a series of acts in a method of providing an ephemeral-transportation option in accordance with one or more embodiments.

FIGS. 1-7, the corresponding text, and the examples provide several different systems, methods, techniques, components, and/or devices of the transportation sharing system 106 in accordance with one or more embodiments. In addition to the above description, FIG. 8 illustrates a flowchart of a series of acts 800 for providing an ephemeral-transportation option in accordance with one or more embodiments. The transportation sharing system 106 may perform one or more acts of the series of acts 800 in addition to or alternatively to one or more acts described in conjunction with other figures. While FIG. 8 illustrates acts according to a respective embodiment, alternative embodiments may omit, add to, reorder, and/or modify any of the acts shown in FIG. 8. The acts of FIG. 8 can be performed as part of a method. Alternatively, a non-transitory computer-readable medium can comprise instructions that, when executed by one or more processors, cause a computing device to perform the acts of FIG. 8. In some embodiments, a system can perform the acts of FIG. 8.

As shown in FIG. 8, the series of acts 800 includes an act 810 of detecting pickup and drop-off locations of a first requestor. In particular, the act 810 can involve detecting a pickup location and a drop-off location associated with a requestor client device of a first requestor. For example, detecting the pickup location and the drop-off location associated with the requestor client device of the first requestor can include: identifying the pickup location and the drop-off location from historical transportation data associated with the first requestor; determining that a current time corresponds to previous transportations from the pickup location from the historical transportation data associated with the first requestor; and determining that a current location of the requestor client device of the first requestor is within a threshold distance of the pickup location associated with the requestor client device of the first requestor. Additionally or alternatively, detecting the pickup location and the drop-off location associated with the requestor client device of the first requestor can include receiving input from the requestor client device identifying the pickup location and the drop-off location using a transportation application on the requestor client device.

As shown in FIG. 8, the series of acts 800 includes an act 820 of detecting an active transportation of a second requestor. In particular, the act 820 can involve detecting an active transportation by a transportation vehicle associated with a second requestor. For example, detecting the active transportation by the transportation vehicle associated with the second requestor can include detecting the active transportation that is on a route that correlates with the pickup and drop-off locations of the first requestor.

As shown in FIG. 8, the series of acts 800 includes an act 830 of matching the first requestor with the active transportation of the second requestor. In particular, the act 830 can involve matching the first requestor with the active transportation by the transportation vehicle associated with the second requestor based on the pickup location and the drop-off location. For example, matching the first requestor with the active transportation by the transportation vehicle associated with the second requestor can include determining that adding one or both of the pickup location and the drop-off location of the first requestor to a route for the transportation vehicle to transport the second requestor would not exceed a threshold amount of additional travel time. In one or more embodiments, the series of acts 800 can include receiving a transportation request from the requestor client device of the first requestor after matching the first requestor with the active transportation by the transportation vehicle associated with the second requestor.

In one or more embodiments, matching the first requestor with the active transportation by the transportation vehicle associated with the second requestor based on the pickup location and the drop-off location includes: determining that the transportation vehicle is traveling along an initial route for the active transportation comprising a designated pickup location and a designated drop-off location associated with the second requestor; generating an adjusted route for the transportation vehicle comprising the designated pickup location and the designated drop-off location associated with the second requestor and the pickup location and the drop-off location associated with the first requestor; determining a travel-time difference between an initial travel time for the initial route and an adjusted travel time for the adjusted route; and matching the first requestor with the active transportation by the transportation vehicle associated with the second requestor based on the travel-time difference satisfying a threshold amount of additional travel time.

As shown in FIG. 8, the series of acts 800 includes an act 840 of providing an ephemeral-transportation option for the first requestor to share the active transportation with the second requestor. In particular, the act 840 can involve, based on matching the first requestor with the active transportation, providing, to the requestor client device of the first requestor, an ephemeral-transportation option for the first requestor to share the active transportation by the transportation vehicle with the second requestor. For example, providing the ephemeral-transportation option can include providing the ephemeral-transportation option within a graphical user interface including a provider indicator for a provider of the transportation vehicle and a graphical representation of a route for the transportation vehicle to transport the first requestor and the second requestor. Providing the ephemeral-transportation option can further include providing the ephemeral-transportation option within a graphical user interface including an estimated time of arrival of the transportation vehicle at the drop-off location of the first requestor and a price for transporting the first requestor from the pickup location to the drop-off location.

In one or more embodiments, providing the ephemeral-transportation option can include providing the ephemeral-transportation option for display on the requestor client device for a predetermined time and removing the ephemeral-transportation option after expiration of the predetermined time without a selection of the ephemeral-transportation option. Additionally, providing the ephemeral-transportation option can include providing, to the requestor client device of the first requestor, the ephemeral-transportation option in connection with providing a push notification to the requestor client device for a threshold amount of time. In some embodiments, the series of acts 800 includes acts of: detecting a selection by the first requestor of the ephemeral-transportation option; and based on detecting the selection of the ephemeral-transportation option, sending instructions to a provider client device associated with the transportation vehicle to travel to the pickup location associated with the requestor client device of the first requestor.

Figure 9:
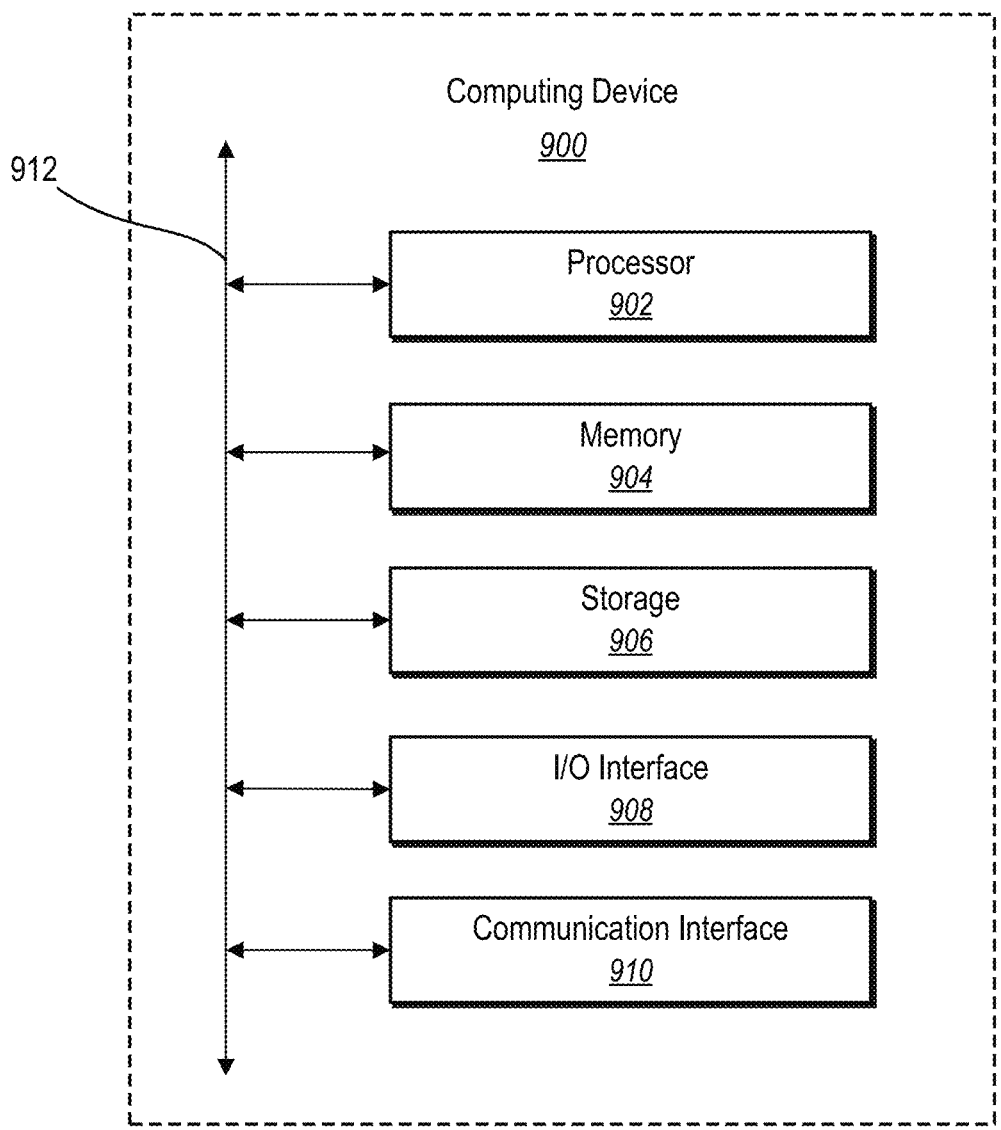
FIG. 9 illustrates a block diagram of an example computing device in accordance with one or more embodiments.

FIG. 9 illustrates a block diagram of an example computing device 900 that may be configured to perform one or more of the processes described above. One will appreciate that one or more computing devices, such as the computing device 900 may represent the computing devices described above (e.g., the computing system 700, the server(s) 102, the requestor client devices 116a-116n, the provider client devices 110a-110n). In one or more embodiments, the computing device 900 may be a mobile device (e.g., a mobile telephone, a smartphone, a PDA, a tablet, a laptop, a camera, a tracker, a watch, a wearable device, etc.). In some embodiments, the computing device 900 may be a non-mobile device (e.g., a desktop computer or another type of client device). Further, the computing device 900 may be a server device that includes cloud-based processing and storage capabilities.

As shown in FIG. 9, the computing device 900 can include one or more processor(s) 902, memory 904, a storage device 906, input/output interfaces 908 (or "I/O interfaces 908"), and a communication interface 910, which may be communicatively coupled by way of a communication infrastructure (e.g., bus 912). While the computing device 900 is shown in FIG. 9, the components illustrated in FIG. 9 are not intended to be limiting. Additional or alternative components may be used in other embodiments. Furthermore, in certain embodiments, the computing device 900 includes fewer components than those shown in FIG. 9. Components of the computing device 900 shown in FIG. 9 will now be described in additional detail.

In particular embodiments, the processor(s) 902 includes hardware for executing instructions, such as those making up a computer program. As an example, and not by way of limitation, to execute instructions, the processor(s) 902 may retrieve (or fetch) the instructions from an internal register, an internal cache, memory 904, or a storage device 906 and decode and execute them.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 904 may be internal or distributed memory.

The computing device 900 includes a storage device 906 includes storage for storing data or instructions. As an example, and not by way of limitation, the storage device 906 can include a non-transitory storage medium described above. The storage device 906 may include a hard disk drive (HDD), flash memory, a Universal Serial Bus (USB) drive or a combination these or other storage devices.

As shown, the computing device 900 includes one or more I/O interfaces 908, which are provided to allow a user to provide input to (such as user strokes), receive output from, and otherwise transfer data to and from the computing device 900. These I/O interfaces 908 may include a mouse, keypad or a keyboard, a touch screen, camera, optical scanner, network interface, modem, other known I/O devices or a combination of such I/O interfaces 908. The touch screen may be activated with a stylus or a finger.

The I/O interfaces 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 908 are configured to provide graphical data to a display for presentation to a user. The graphical data may be representative of one or more graphical user interfaces and/or any other graphical content as may serve a particular implementation.

The computing device 900 can further include a communication interface 910. The communication interface 910 can include hardware, software, or both. The communication interface 910 provides one or more interfaces for communication (such as, for example, packet-based communication) between the computing device and one or more other computing devices or one or more networks. As an example, and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI. The computing device 900 can further include a bus 912. The bus 912 can include hardware, software, or both that connects components of the computing device 900 to each other.

Figure 10:
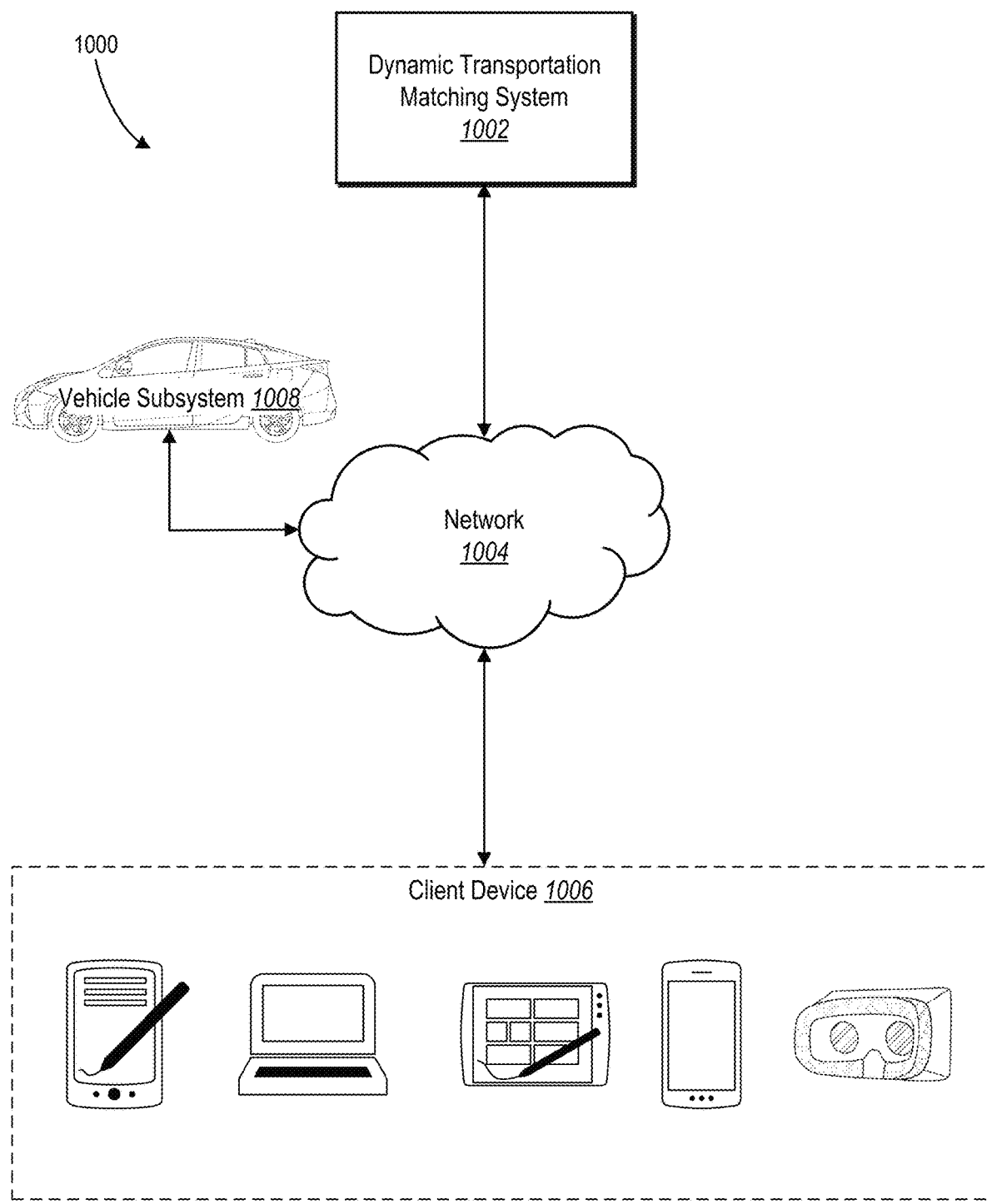
FIG. 10 illustrates an example network environment of a dynamic transportation matching system in accordance with one or more embodiments.

FIG. 10 illustrates an example network environment 1000 of a dynamic transportation matching system (e.g., the dynamic transportation matching system 104). The network environment 1000 includes a client device 1006, a dynamic transportation matching system 1002, and a vehicle subsystem 1008 connected to each other by a network 1004. Although FIG. 10 illustrates a particular arrangement of the client device 1006, the dynamic transportation matching system 1002, the vehicle subsystem 1008, and the network 1004, this disclosure contemplates any suitable arrangement of the client device 1006, the dynamic transportation matching system 1002, the vehicle subsystem 1008, and the network 1004. As an example, and not by way of limitation, two or more of the client devices 1006, the dynamic transportation matching system 1002, and the vehicle subsystem 1008 communicate directly, bypassing the network 1004. As another example, two or more of the client devices 1006, the dynamic transportation matching system 1002, and the vehicle subsystem 1008 may be physically or logically co-located with each other in whole or in part. Moreover, although FIG. 10 illustrates a particular number of the client devices 1006, the dynamic transportation matching systems 1002, the vehicle subsystems 1008, and the networks 1004, this disclosure contemplates any suitable number of the client devices 1006, the dynamic transportation matching systems 1002, the vehicle subsystems 1008, and the networks 1004. As an example, and not by way of limitation, the network environment 1000 may include multiple client devices 1006, the dynamic transportation matching systems 1002, the vehicle subsystems 1008, and the networks 1004.

This disclosure contemplates any suitable network 1004. As an example, and not by way of limitation, one or more portions of the network 1004 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. The network 1004 may include one or more networks 1004.

Links may connect the client device 1006, the dynamic transportation matching system 1002, and the vehicle subsystem 1008 to the communication network 1004 or to each other. This disclosure contemplates any suitable links. In particular embodiments, one or more links include one or more wireline (such as for example Digital Subscriber Line (DSL) or Data Over Cable Service Interface Specification (DOCSIS), wireless (such as for example Wi-Fi or Worldwide Interoperability for Microwave Access (WiMAX), or optical (such as for example Synchronous Optical Network (SONET) or Synchronous Digital Hierarchy (SDH) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout the network environment 1000. One or more first links may differ in one or more respects from one or more second links.

In particular embodiments, the client device 1006 may be an electronic device including hardware, software, or embedded logic components or a combination of two or more such components and capable of carrying out the appropriate functionalities implemented or supported by the client device 1006. As an example, and not by way of limitation, a client device 1006 may include any of the computing devices discussed above in relation to FIG. 10. A client device 1006 may enable a network user at the client device 1006 to access a network. A client device 1006 may enable its user to communicate with other users at other client devices 1006.

In particular embodiments, the client device 1006 may include a transportation service application or a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at the client device 1006 may enter a Uniform Resource Locator (URL) or other address directing the web browser to a particular server (such as server), and the web browser may generate a Hyper Text Transfer Protocol (HTTP) request and communicate the HTTP request to server. The server may accept the HTTP request and communicate to client device 1006 one or more Hyper Text Markup Language (HTML) files responsive to the HTTP request. The client device 1006 may render a webpage based on the HTML files from the server for presentation to the user. This disclosure contemplates any suitable webpage files. As an example, and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, the dynamic transportation matching system 1002 may be a network-addressable computing system that can host a ride share transportation network. The dynamic transportation matching system 1002 may generate, store, receive, and send data, such as, for example, user-profile data, concept-profile data, text data, ride request data, GPS location data, provider data, requestor data, vehicle data, or other suitable data related to the ride share transportation network. This may include authenticating the identity of providers and/or vehicles who are authorized to provide ride services through the dynamic transportation matching system 1002. In addition, the transportation service system may manage identities of service requestors such as users/requestors. In particular, the transportation service system may maintain requestor data such as driving/riding histories, personal data, or other user data in addition to navigation and/or traffic management services or other location services (e.g., GPS services).

In particular embodiments, the dynamic transportation matching system 1002 may manage ride matching services to connect a user/requestor with a vehicle and/or provider. By managing the ride matching services, the dynamic transportation matching system 1002 can manage the distribution and allocation of vehicle subsystem resources and user resources such as GPS location and availability indicators, as described herein.

The dynamic transportation matching system 1002 may be accessed by the other components of the network environment 1000 either directly or via network 1004. In particular embodiments, the dynamic transportation matching system 1002 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, the dynamic transportation matching system 1002 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 1006, or a dynamic transportation matching system 1002 to manage, retrieve, modify, add, or delete, the information stored in data store.

In particular embodiments, the dynamic transportation matching system 1002 may provide users with the ability to take actions on various types of items or objects, supported by the dynamic transportation matching system 1002. As an example, and not by way of limitation, the items and objects may include ride share networks to which users of the dynamic transportation matching system 1002 may belong, vehicles that users may request, location designators, computer-based applications that a user may use, transactions that allow users to buy or sell items via the service, interactions with advertisements that a user may perform, or other suitable items or objects. A user may interact with anything that is capable of being represented in the dynamic transportation matching system 1002 or by an external system of a third-party system, which is separate from the dynamic transportation matching system 1002 and coupled to the dynamic transportation matching system 1002 via a network 1004.

In particular embodiments, the dynamic transportation matching system 1002 may be capable of linking a variety of entities. As an example, and not by way of limitation, the dynamic transportation matching system 1002 may enable users to interact with each other or other entities, or to allow users to interact with these entities through an application programming interfaces (API) or other communication channels.

In particular embodiments, the dynamic transportation matching system 1002 may include a variety of servers, sub-systems, programs, modules, logs, and data stores. In particular embodiments, the dynamic transportation matching system 1002 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The dynamic transportation matching system 1002 may also include suitable components such as network interfaces, security mechanisms, load balancers, failover servers, management-and-network-operations consoles, other suitable components, or any suitable combination thereof. In particular embodiments, the dynamic transportation matching system 1002 may include one or more user-profile stores for storing user profiles. A user profile may include, for example, biographic information, demographic information, behavioral information, social information, or other types of descriptive information, such as work experience, educational history, hobbies or preferences, interests, affinities, or location.

The web server may include a mail server or other messaging functionality for receiving and routing messages between the dynamic transportation matching system 1002 and one or more client devices 1006. An action logger may be used to receive communications from a web server about a user's actions on or off the dynamic transportation matching system 1002. In conjunction with the action log, a third-party-content-object log may be maintained of user exposures to third-party-content objects. A notification controller may provide information regarding content objects to a client device 1006. Information may be pushed to a client device 1006 as notifications, or information may be pulled from the client device 1006 responsive to a request received from the client device 1006. Authorization servers may be used to enforce one or more privacy settings of the users of the dynamic transportation matching system 1002. A privacy setting of a user determines how particular information associated with a user can be shared. The authorization server may allow users to opt in to or opt out of having their actions logged by the dynamic transportation matching system 1002 or shared with other systems, such as, for example, by setting appropriate privacy settings. Third-party-content-object stores may be used to store content objects received from third parties. Location stores may be used for storing location information received from the client devices 1006 associated with users.

In addition, the vehicle subsystem 1008 can include a human-operated vehicle or an autonomous vehicle. A provider of a human-operated vehicle can perform maneuvers to pick up, transport, and drop off one or more requestors according to the embodiments described herein. In certain embodiments, the vehicle subsystem 1008 can include an autonomous vehicle—i.e., a vehicle that does not require a human operator. In these embodiments, the vehicle subsystem 1008 can perform maneuvers, communicate, and otherwise function without the aid of a human provider, in accordance with available technology.

In particular embodiments, the vehicle subsystem 1008 may include one or more sensors incorporated therein or associated thereto. For example, sensor(s) can be mounted on the top of the vehicle subsystem 1008 or else can be located within the interior of the vehicle subsystem 1008. In certain embodiments, the sensor(s) can be located in multiple areas at once—i.e., split up throughout the vehicle subsystem 1008 so that different components of the sensor(s) can be placed in different locations in accordance with optimal operation of the sensor(s). In these embodiments, the sensor(s) can include a LIDAR sensor and an inertial measurement unit (IMU) including one or more accelerometers, one or more gyroscopes, and one or more magnetometers. The sensor suite can additionally or alternatively include a wireless IMU (WIMU), one or more cameras, one or more microphones, or other sensors or data input devices capable of receiving and/or recording information relating to navigating a route to pick up, transport, and/or drop off a requestor.

In particular embodiments, the vehicle subsystem 1008 may include a communication device capable of communicating with the client device 1006 and/or the dynamic transportation matching system 1002. For example, the vehicle subsystem 1008 can include an on-board computing device communicatively linked to the network 1004 to transmit and receive data such as GPS location information, sensor-related information, requestor location information, or other relevant information.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A system comprising:
    at least one processor; and
    a non-transitory computer readable storage medium comprising instructions that, when executed by the at least one processor, cause the system to:
        while a transportation application is not currently active on a requestor client device of a first requestor:
            detect a pickup location and a drop-off location associated with the requestor client device of the first requestor, the requestor client device of the first requestor comprising at least one of a mobile telephone, a smartphone, a personal digital assistant, a watch, or a wearable device;
            detect an active transportation by a transportation vehicle associated with a second requestor; and match the first requestor with the active transportation by the transportation vehicle associated with the second requestor based on the pickup location, the drop-off location, and a determination of a threshold selection time sufficient for the first requestor to consider and accept a match with the active transportation;
    based on matching the first requestor with the active transportation, provide, for display on the requestor client device of the first requestor, an ephemeral-transportation option for the first requestor to share the active transportation by the transportation vehicle with the second requestor by overlaying the ephemeral-transportation option on an active display of the requestor client device of the first requestor while the transportation application is not currently active on the requestor client device of the first requestor; and
    based on receiving, from the requestor client device of the first requestor, an indication of a user interaction with the ephemeral-transportation option, providing, to a provider client device, navigation instructions to divert the transportation vehicle to the pickup location.

2. The system as recited in claim 1, further comprising instructions that, when executed by the at least one processor, cause the system to determine the threshold selection time based on a method of providing the ephemeral-transportation option to the requestor client device of the first requestor wherein the method of providing the ephemeral-transportation option comprises providing the ephemeral-transportation option via a push notification.

3. The system as recited in claim 1, wherein the instructions, when executed by the at least one processor, cause the system to provide the navigation instructions to divert the transportation vehicle to the pickup location by providing updated route guidance to travel along an adjusted route diverging from an initial route associated with the active transportation to include the pickup location and the drop-off location.

4. The system as recited in claim 1, further comprising instructions that, when executed by the at least one processor, cause the system to detect the pickup location and the drop-off location associated with the requestor client device of the first requestor by:
    identifying the pickup location and the drop-off location from historical transportation data associated with the first requestor;
    determining that a current time corresponds to previous transportations from the pickup location from the historical transportation data associated with the first requestor; and
    determining that a current location of the requestor client device of the first requestor is within a threshold distance of the pickup location associated with the requestor client device of the first requestor.

5. The system as recited in claim 1, further comprising instructions that, when executed by the at least one processor, cause the system to detect the pickup location and the drop-off location associated with the requestor client device of the first requestor by receiving input from the requestor client device identifying the pickup location and the drop-off location using the transportation application on the requestor client device.

6. The system as recited in claim 1, further comprising instructions that, when executed by the at least one processor, cause the system to match the first requestor with the active transportation by the transportation vehicle associated with the second requestor based on the pickup location and the drop-off location by determining that adding one or both of the pickup location and the drop-off location of the first requestor to a route for the transportation vehicle to transport the second requestor would not exceed a threshold amount of additional travel time.

7. A non-transitory computer readable storage medium comprising instructions that, when executed by at least one processor, cause a computing device to:
    while a transportation application is not currently active on a requestor client device of a first requestor:
        detect a pickup location and a drop-off location associated with the requestor client device of the first requestor, the requestor client device of the first requestor comprising at least one of a mobile telephone, a smartphone, a personal digital assistant, a watch, or a wearable device;
        detect an active transportation by a transportation vehicle associated with a second requestor; and
        match the first requestor with the active transportation by the transportation vehicle associated with the second requestor based on the pickup location, the drop-off location, and a determination of a threshold selection time sufficient for the first requestor to consider and accept a match with the active transportation;
    based on matching the first requestor with the active transportation, provide, for display on the requestor client device of the first requestor, an ephemeral-transportation option for the first requestor to share the active transportation by the transportation vehicle with the second requestor by overlaying the ephemeral-transportation option on an active display of the requestor client device of the first requestor while the transportation application is not currently active on the requestor client device of the first requestor; and
    based on receiving, from the requestor client device of the first requestor, an indication of a user interaction with the ephemeral-transportation option, providing, to a provider client device, navigation instructions to divert the transportation vehicle to the pickup location.

8. The non-transitory computer readable storage medium of claim 7, further comprising instructions that, when executed by the at least one processor, cause the computing device to provide, to the requestor client device of the first requestor, the ephemeral-transportation option by providing the ephemeral-transportation option for display on the requestor client device for a predetermined time and removing the ephemeral-transportation option after expiration of the predetermined time without a selection of the ephemeral-transportation option.

9. The non-transitory computer readable storage medium of claim 7, further comprising instructions that, when executed by the at least one processor, cause the computing device to provide, to the requestor client device of the first requestor, the ephemeral-transportation option in connection with providing a push notification to the requestor client device for a threshold amount of time.

10. The non-transitory computer readable storage medium of claim 7, further comprising instructions that, when executed by the at least one processor, cause the computing device to match the first requestor with the active transportation by the transportation vehicle associated with the second requestor prior to receiving a transportation request from the requestor client device of the first requestor.

11. The non-transitory computer readable storage medium of claim 7, further comprising instructions that, when executed by the at least one processor, cause the computing device to match the first requestor with the active transportation by the transportation vehicle associated with the second requestor based on the pickup location and the drop-off location by:
   determining that the transportation vehicle is traveling along an initial route for the active transportation comprising a designated pickup location and a designated drop-off location associated with the second requestor;
   generating an adjusted route for the transportation vehicle comprising the designated pickup location and the designated drop-off location associated with the second requestor and the pickup location and the drop-off location associated with the first requestor;
   determining a travel-time difference between an initial travel time for the initial route and an adjusted travel time for the adjusted route; and
   matching the first requestor with the active transportation by the transportation vehicle associated with the second requestor based on the travel-time difference satisfying a threshold amount of additional travel time.

12. The non-transitory computer readable storage medium of claim 7, wherein matching the first requestor with the active transportation by the transportation vehicle associated with the second requestor further comprises determining a weighted likelihood score for the first requestor.

13. The non-transitory computer readable storage medium of claim 12, wherein determining the weighted likelihood score for the first requestor comprises determining a number of times the first requestor has accepted previous matches associated with ephemeral-transportation options.

14. A method comprising:
   while a transportation application is not currently active on a requestor client device of a first requestor:
      detecting, by one or more processors of a transportation sharing system, a pickup location and a drop-off location associated with the requestor client device of the first requestor, the requestor client device of the first requestor comprising at least one of a mobile telephone, a smartphone, a personal digital assistant, a watch, or a wearable device;
      detecting, by the one or more processors, an active transportation by a transportation vehicle associated with a second requestor; and
      matching, by the one or more processors, the first requestor with the active transportation by the transportation vehicle associated with the second requestor based on the pickup location, the drop-off location, and a determination of a threshold selection time sufficient for the first requestor to consider and accept a match with the active transportation;
   based on matching the first requestor with the active transportation, providing, for display on the requestor client device of the first requestor, an ephemeral-transportation option for the first requestor to share the active transportation by the transportation vehicle with the second requestor by overlaying the ephemeral-transportation option on an active display of the requestor client device of the first requestor while the transportation application is not currently active on the requestor client device of the first requestor; and
   based on receiving, from the requestor client device of the first requestor, an indication of a user interaction with the ephemeral-transportation option, providing, to a provider client device, navigation instructions to divert the transportation vehicle to the pickup location.

15. The method as recited in claim 14, wherein providing the ephemeral-transportation option for the first requestor to share the active transportation by the transportation vehicle with the second requestor further comprises providing the ephemeral-transportation option within a graphical user interface comprising a provider indicator for a provider of the transportation vehicle and a graphical representation of a route for the transportation vehicle to transport the first requestor and the second requestor.

16. The method as recited in claim 14, wherein providing the ephemeral-transportation option for the first requestor to share the active transportation by the transportation vehicle with the second requestor further comprises providing the ephemeral-transportation option within a graphical user interface comprising an estimated time of arrival of the transportation vehicle at the drop-off location of the first requestor and a price for transporting the first requestor from the pickup location to the drop-off location.

17. The method as recited in claim 14, wherein providing the ephemeral-transportation option further comprises providing the ephemeral-transportation option for display on the requestor client device for a predetermined time and removing the ephemeral-transportation option after expiration of the predetermined time without a selection of the ephemeral-transportation option.

18. The method as recited in claim 14, wherein detecting the pickup location and the drop-off location associated with the requestor client device of the first requestor comprises receiving input from the requestor client device identifying the pickup location and the drop-off location using the transportation application on the requestor client device.

19. The method as recited in claim 14, further comprising receiving a transportation request from the requestor client device of the first requestor after matching the first requestor with the active transportation by the transportation vehicle associated with the second requestor.

20. The method as recited in claim 14, wherein matching the first requestor with the active transportation by the transportation vehicle associated with the second requestor based on the pickup location and the drop-off location comprises:
   determining that the transportation vehicle is traveling along an initial route for the active transportation comprising a designated pickup location and a designated drop-off location associated with the second requestor;
   generating an adjusted route for the transportation vehicle comprising the designated pickup location and the designated drop-off location associated with the second requestor and the pickup location and the drop-off location associated with the first requestor;
   determining a travel-time difference between an initial travel time for the initial route and an adjusted travel time for the adjusted route; and
   matching the first requestor with the active transportation by the transportation vehicle associated with the second requestor based on the travel-time difference being within a threshold amount of additional travel time.

* * * * *